United States Patent [19]

Crain

[11] Patent Number: 4,962,473

[45] Date of Patent: Oct. 9, 1990

[54] EMERGENCY ACTION SYSTEMS INCLUDING CONSOLE AND SECURITY MONITORING APPARATUS

[75] Inventor: Lawrence Crain, Pompton Lakes, N.J.

[73] Assignee: ITT Corporation, New York, N.Y.

[21] Appl. No.: 283,439

[22] Filed: Dec. 9, 1988

[51] Int. Cl.[5] ........................ G06F 15/16; G08B 5/22; G08B 13/00

[52] U.S. Cl. .................................... 364/900; 340/541; 340/825.37; 364/918.7; 364/919; 364/927.2; 364/931.4

[58] Field of Search ................ 364/200, 900; 340/541, 340/825.37, 502

[56] References Cited

U.S. PATENT DOCUMENTS 4,536,747 8/1985 Jensen ................................ 340/502

*Primary Examiner*—Raulfe B. Zache

*Attorney, Agent, or Firm*—Thomas N. Twomey

[57] ABSTRACT

There is described an emergency action system which is an integrated security control and communications system employed for relatively large and secure installations such as embassies, military buildings and so on. The emergency action system apparatus consists of two major subdivisions. A first subdivision is a security and control subsystem which operates to monitor and control sensors and actuators associated with an intrusion detection system. The security and control subsystem handles event logging, generates alarm map displays and switches and distributes surveillance video. The second subdivision of the system is associated with user emergency action consoles which consoles provide the interface and handle voice and data communications to enable the user to interface with the existing communications system as located on the installation as well as with the intrusion detection system. The consoles include direct control circuits which provide for rapid fail safe actuation of various controls throughout the building such as doors and so on. The console contains various displays to enable the user to interface with both systems. This enables the user to control and monitor system operation from a single console which serves to integrate control of both the intrusion detection system as well as the communication system as existing on the premises.

21 Claims, 18 Drawing Sheets

CONSOLE OVERVIEW (SIMPLIFIED)

EMERGENCY ACTION SYSTEMS INCLUDING CONSOLE AND SECURITY MONITORING APPARATUS

BACKGROUND OF INVENTION

This invention relates to an emergency action system and more particularly to a system apparatus for integrating and monitoring security systems and communications systems and including consoles to enable the user to interface directly with both types of system.

The term emergency action system defines a system which monitors and controls sensors and actuators which are associated with secured premises. The sensors and actuators for example may be switch-type devices, fire detection devices, or other sensors which are normally used with conventional intrusion detection systems.

The emergency action system allows the security portion of this system to interface with communication links such as telephone circuits and with external sources of data, such as computers or local area data networks (LAN). The apparatus enables a user to oversee system functions by means of a user console which console has the ability to monitor system operation both from the security and communications aspects. In this manner the action officer or guard who is posted at the console can ascertain multiple conditions of system operation. One unique feature of this system is its architecture which enables the system to be expanded indefinitely as the need for expansion increases.

Essentially the prior art is replete with numerous consoles and other devices which operate in conjunction with communications and command center activities. These prior systems show a serious need for an improved integrated generic control and a communications console which will enable one individual to monitor and control both communications and security provisions in a large facility, such as for example in a plant or office complex, an embassy, a military base, or other area where high security and reliable communications are required.

The prior art systems resulted in the implementation of multiple unique custom console designs which were designed for a specific sensor system, a particular control system, or a specialized activity. Hence a particular facility may have included many different types of consoles and control panels in order to monitor various systems which were contained within the facility. In order to provide communications and security checks, such large facilities often include their own telephone switching system, such as private automatic branch exchanges (PABX), which also required separate consoles and separate monitoring means.

As one can understand, key difficulties associated with the prior art approaches is the cost of developing and providing such individual custom consoles, as well the problems of fitting them all into a limited space.

Another significant problem is the cost in providing individual operators or persons to monitor each console. In this respect each of the operators of the different consoles has to be separately trained in order to understand the functions and operations of each console and its system. And coordinating this multiplicity of operators limited the timelyness and effectiveness of response in crisis management situations.

Furthermore, such prior art systems gave little more than access to the various communications and security systems, rather than providing integrated and automatic response to events and support to the crisis manager in evaluating the situation and taking appropriate actions.

Logistics and maintenance for these custom consoles was also difficult and expensive. And, it was often found that as the system requirements expanded, for example adding communications circuits or new types of sensors or controls, the console had to be significantly modified or even completely replaced. Finally, it was frequently difficult or impossible to replace individual console components with technically more modern modules. In this manner such prior art systems rapidly became obsolete.

Therefore it is an object of the present invention to provide a uniform generally applicable console to enable a user to access an arbitrary set of voice and data communications services, as well as to interface with various security and facility management systems. The system operates to monitor and control sensors and actuators, handles event logging, generates alarm maps and related displays, and switches and distributes surveillance video. The system described will generally use the existing complement of sensors and actuators as included in an existing intrusion subsystem, existing video surveillance equipment, and the existing voice and data communication subsystems. The present invention operates to integrate the operation so that these separate subsystems can be conveniently monitored by a single console to enable a single operator to monitor and therefore control the various subsystems of concern. It further provides aids and databases to assist in the planning of appropriate responses to crisis events, and the timely and error-free execution of those plans.

SUMMARY OF THE INVENTION

An emergency action apparatus for use in an installation requiring integration of security, communications, and facility management systems, said emergency action apparatus providing an interface between said systems to enable a user to monitor and control the operation of said systems at a single location, comprising: one or more consoles located at said location, each said console including a position control computer located in said console and having input means coupled to said communications systems and operative to process data relating to the format of said installation, a first display located on said console and coupled to said position control computer to display processed data from said computer indicative of said installation format, a user interface computer located in said console and operative to process specialized databases containing information related to the personnel located in said installation to enable said user to determine the status of said personnel and including stored individual and conference call data to enable said user to connect selected personnel via said communications system either individually or together to participate in a conference, a second display located on said console and coupled to said user interface computer to enable data as processed by said computer to be displayed, said user interface computer coupled to said position control computer to enable data to be transferred between said computers, means coupled to said user interface computer to enable said user to interface with said computer via said second display wherein said user can set up conferences between personnel and display stored data regarding said personnel, an environment and security processor located either within or remote from said consoles and coupled to said intrusion detection systems for processing data regarding said intrusion detection systems and for storing data related to said installation format and to provide and process data indicative of monitored detection system functions and having output lines coupled to said position control computer and said first display, a video matrix coupled to said environment and security processor and controlled thereby to switch video signals as provided by said surveillance and intrusion detection systems, a third display located on said consoles and coupled to said video matrix to display said video signals as controlled by said environment and security processor.

BRIEF DESCRIPTIONS OF FIGURES

DETAILED DESCRIPTION OF INVENTION

Figure 1:
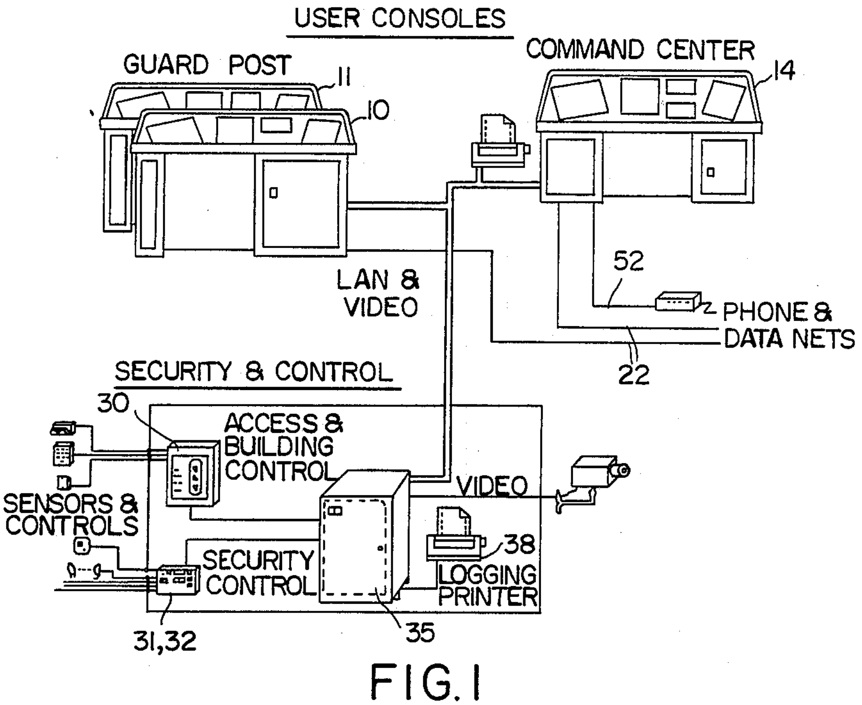
FIG. 1 is an overview of a typical emergency action system according to this invention.

Referring to FIG. 1 there is shown an overview of a typical emergency action system according to this invention. Such a typical system will include consoles for guards and a superviser, a security and control subsystem, and interconnections between these major components. As shown, the emergency action system will connect to various sensors, controls, surveillance facilities, and voice and data communications systems at the building or other facility where it is installed.

Figure 2:
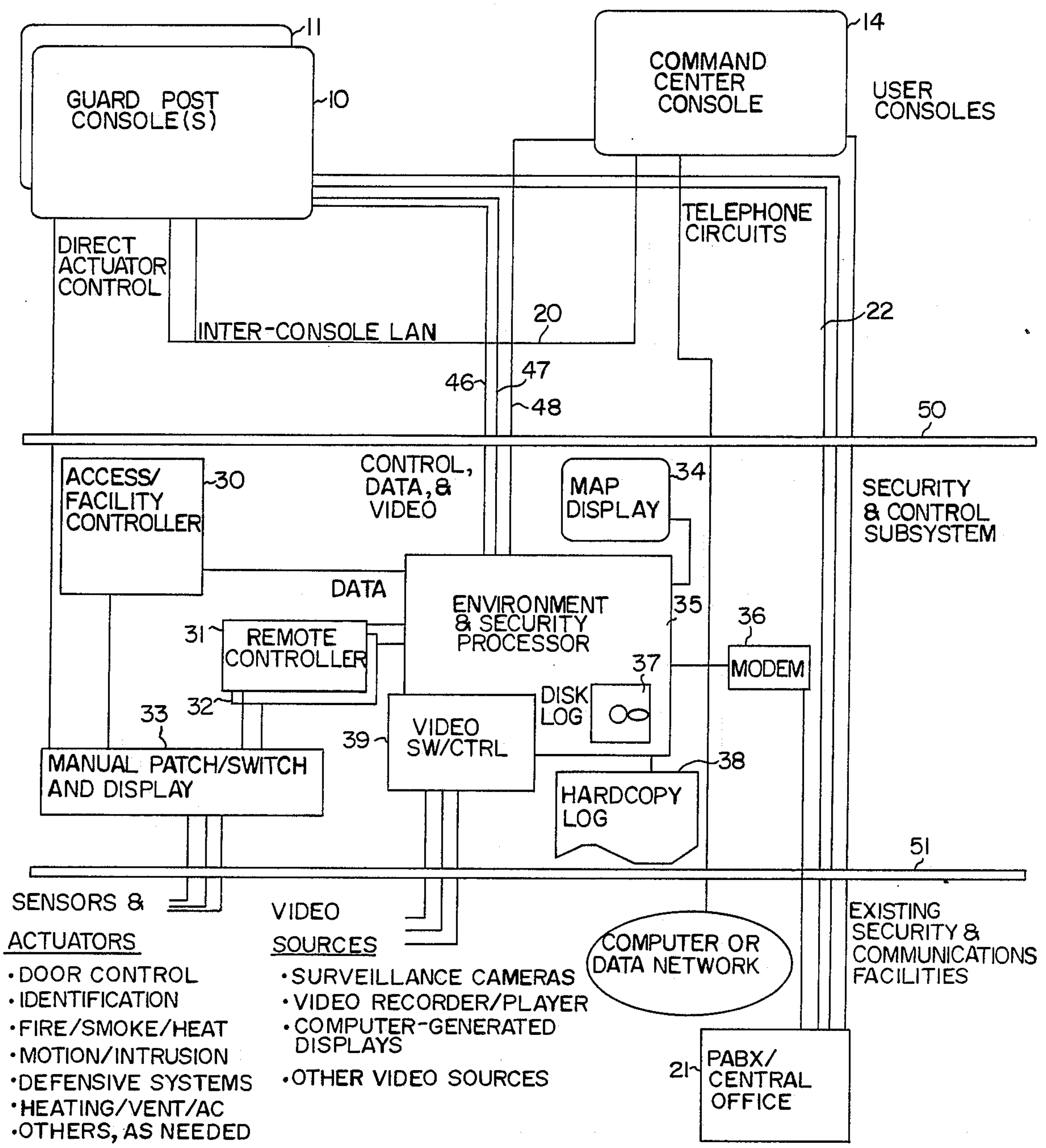
FIG. 2 is a block diagram of an emergency action system including consoles and security monitoring apparatus according to this invention.

Referring to FIG. 2 there is shown a more detaled block diagram of the typical emergency action system outlined in FIG. 1. For purposes of explanation, and as determined from the right hand side of FIG. 2, the system is split by means of the dashed lines 50 into User Consoles and the Security and Control Subsystem. Dashed line 51 shows the boundary between the emergency action system of this invention, and the various sensors, controls, surveillance, voice and data communications systems to which it interfaces.

Thus as seen in FIG. 1 and 2, there are a series of user consoles. The consoles 10 and 11 are, for example, specified as guard post consoles. The system may also include supervisory or command center consoles as 14. The capabilities and implementation of these consoles will be described in detail later.

It should be understood before proceeding further, however, that the number and classes of consoles will dependant on the requirements of the specific application. In a large or multi-building installation, there may be several of each class of console, as well as derivative versions of the console for specialized roles. In a small installation, on the other hand, there may be only a single guard console, and that console may also assume the security and control subsystem (SCS) functions, rather than having a separate SCS element.

It will be further understood that the command center type console 14 is of a similar configuration to the guard post type consoles as 10 and 11. The differences are primarily cabinetry and number of each type of internal console component. However, these two classes of consoles (plus any derivative models) are interchangeable from a design and functional point of view. Thus, an authorized user with the correct access password can use either type of console to perform any system control function.

As seen from FIG. 2, the guard consoles 10 and 11, and command center console 14 interfaces with each other by means of a bidirectional bus 20 also defined as an inter-console LAN or an inter-console local area network. All consoles are also directly coupled to a voice telephone system such as a private automatic branch (PABX) exchange 21 via telephone line circuits as 22, to allow access to the external telephone networks, as well as to local subscribers at the installation.

Each user console 10,11,14 also has individual bidirectional coupling circuits 46,47,48 to the environment and security processor 35, which enables the console 10,11,14 to exchange information, displays, and commands with the environment and security processor 35. Each of these circuits includes provisions for data interchange, and multiple channels of video.

The second major subsystem is the security and control subsystem (SCS), as defined between the dashed lines 50 and 51. This subsystem performs most of the functions directly involved in monitoring and controlling the physical security of a facility. This security and control subsystem is designed to interface with existing sensors, actuators and surveillance sources with no modification to those existing components. Rather than replacing existing indicators and controls, the SCS bridges across them, to perform invisible monitoring and parallel control. Thus SCS provides the convenience of automatic control and monitoring, without losing the safety net of manual controls and hardware indicators.

The SCS, as indicated above, includes the environment and security processor 35 (ESP) and one or more remote controllers as 31 and 32, a manual patch/switch and display module 33, a video switching and control module 39 (which includes video switching and special effects equipment), and various peripheral devices and displays, 34, 35, 36, 37, 38, and one or more Access/-Facility controllers 30.

The environment and security processor (ESP) 35 basically is the main control component of this system and essentially is implemented by a standard commercial personal computer (PC) with custom programming. An example of such a PC is the ITT Xtra Professional Series 400 computer system as available from ITT Courier Terminal Systems of Edison, NJ. The hardware has been selected and the software designed so that it is easy to interface the system with the existing security and surveillance devices. These include commercial facility access, energy management, and alarm subsystems, which are interfaced with the system without any modification to these commercial subsystems. The environment and security processor 35 also monitors and directs the bulk of the existing "dumb" security devices, such as intrusion detectors, fire sensors, door releases and so on, indirectly, via the remote controllers 31 and 32.

Figure 3:
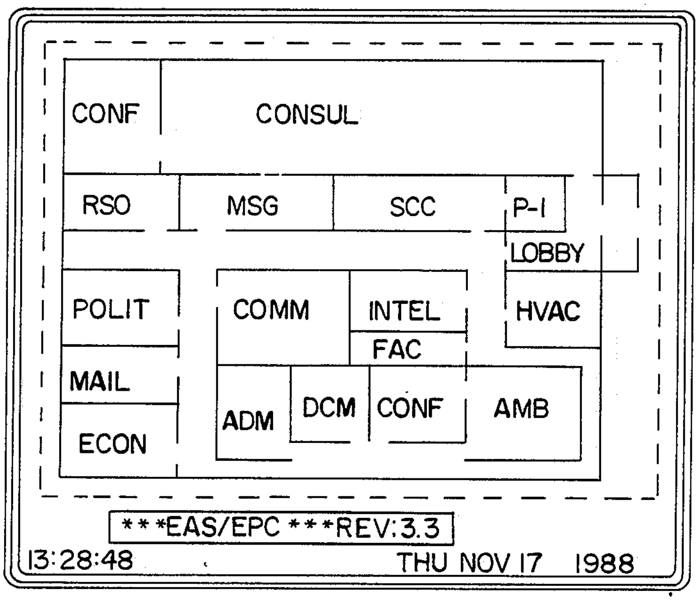
FIG. 3 is a typical facility map as presented on the various displays of the apparatus of this invention, and showing sample alarm indications.

A color graphics display 34 associated with the ESP 35 is used for presenting a map of the facility, with indication of all outstanding alarms, as to their location and type. Such facility maps which are provided in graphical data, FIG. 3 for example. In addition to the display 34 at the ESP 35, the video image of the map is also routed to displays on the consoles 10,11,14 so that a guard or supervisor can view such floor plans with the location of the various sensing devices in such floor plans. Furthermore, additional monitors or devices can be connected to this video signal, so that the alarm map can be viewed in, for example, a situation room, or recorded on video tape or hardcopy.

The ESP 35 operates in conjunction with two devices which are employed to provide automatic permanent logging of all security events and actions. These are an internal removable disk unit 37 which stores the events for off-line automatic analysis and retrieval, and a printer 38 which provides a permanent hard copy log. The ESP 35 can also support remote logging or retrieval of event logs, via dedicated or dial up circuits connected to the modem 36.

The security and control subsystem as shown in FIG. 2 includes a plurality of remote controllers as 30, 31 and 32, which are connected via a manual patch/switch and display module 33 with conventional sensors and actuators located throughout the premises to be monitored. These sensors and actuators, as indicated in FIG. 2, include types which monitor door operation and exercise door control for opening and locking, identification sensors such as magnetic card readers and badge monitors, fire, smoke and heat detectors, motion and intrusion intrusion detectors, defensive actuator systems such as automatic locking of doors, sirens and lamps, sensors and controls for building systems such as heating, ventilation and air conditioning for the controlled premises, and other sensors and actuators as may be needed for monitoring and controlling the specific premises.

The manual patch/switch and display panel 33 has input terminals for receiving leads from monitored sensors and output terminals for directing these leads according to a switch or patch cord format. The panel 33 outputs are coupled to inputs of the remote controller. Such panels as 33 are well known.

As seen from FIG. 2, the environment and security processor exchanges data with the remote controllers 30, 31 and 32 which are of course coupled via the patch/switch and display module 32 to sensors and actuators.

Finally the ESP 35 is programmed to control the video switching matrix 39 and any associated video effects devices, such as split screen devices, titlers and so on. As seen from FIG. 2, the video switch and control circuit 39 which is associated with the environment and security processor 35 accepts input from video sources such as surveillance cameras, video tape recorders, computer generated displays and other video sources. As one can understand, in a large facility which is being monitored there may be video cameras distributed throughout the facility in order to enable the guard, who is posted at the console, to view these areas to thereby ascertain whether the areas are secure or, if populated, who are the persons within such areas. This is typical of conventional surveillance techniques all of which can now be monitored and controlled via the consoles as 10 11, and 14. The video switch control module 39 capabilities center on a commercial N×M video switch matrix. These matrixes are well known and can operate to connect any video source at say an N terminal to an M terminal for essentially switching a plurality of video sources to a plurality of monitors. An example of a suitable matrix is available from one Panasonic Corp. of Japan designated as a Remote Control Video Switch, with 10 inputs and 2 outputs. Thus N is the number of sources, as surveillance cameras, video tape/disk players, special effects generators, while M is the number of outputs needed for the various consoles as 10, 11 and 14 which include two or more monitors associated with each console. As with the alarm map displays, there may be other monitors located within the monitored premises and the video matrix will provide video outputs for these monitors. In any event, as one can see, modularity and/or access capacity provides for growth by using the video matrix as part and parcel of the video switch/control module 39. The video switching equipment is fitted and interfaces so that the ESP 35 can exercise control of the same.

It is understood that special effect devices can include split screen, video printers, titlers and so on. All these devices are commercially available and are well known devices. There may be other items such as standby and manual controls or manual patching facilities which also may be associated with the video switch/control module 39 as required for specific applications. The control and switching of the surveillance video is centralized and completely under the control of the ESP 35 to improve security and to simplify manual operations in the event of computer failure.

The non-remote elements of the security and control subsystem — the ESP 35, video switching matrix 39, logging disk 37, printer 38, and a controller, such as 31, with responsibility for the most critical sensors and actuators — are generally installed in a centralized protective area such as the security control center or a safe haven within the premises to be secured. This is all important to prevent tampering with the system. As a further precaution, all these elements except the printer are housed inside a locked cabinet, and all include tamper alarms.

As one can ascertain, these elements are the core of the security control subsystem and hence must operate even in the event of loss of external power. Thus, as an unterruptable power supply is provided as part of the security and control subsystem. The processor 35, due to the nature of the same, is capable of large growth potential, processing power, increase in memory and the employment of different interface slots. The use of an industry standard PC architecture and operating system with custom applications in the interface software programs in a high level language provides insurance that even if the initial processor eventually must be upgraded, the swap over to a more powerful processor for the environment and security processor 35 is relatively easy and trouble free.

Figure 16:
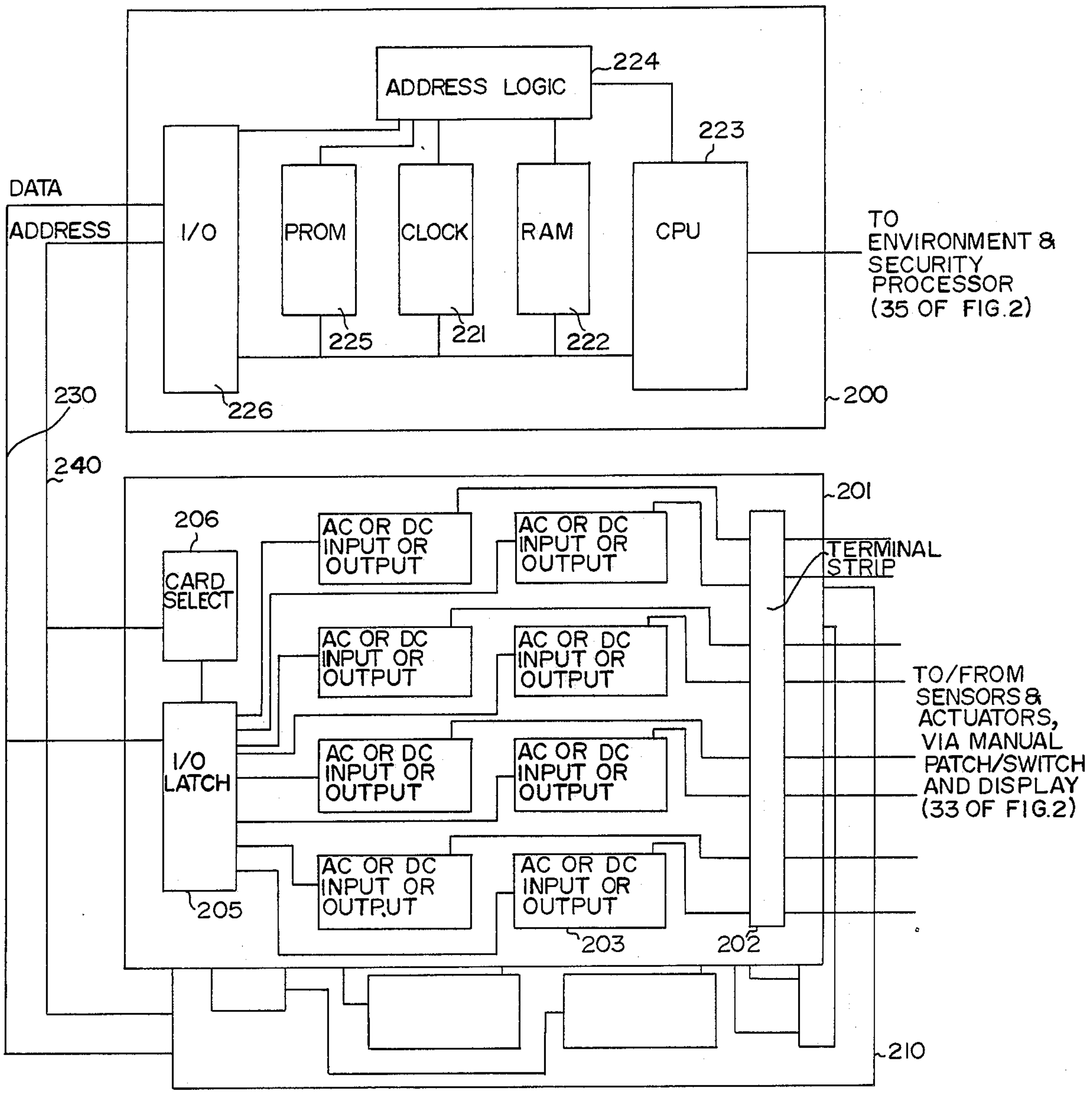
FIG. 16 is a block diagram of a remote controller as used by this system.

Each remote controller as 31 and 32 is a dedicated firmware programed control computer 200 with suitable interface boards 201, 210, as in FIG. 16. A smart cluster controller is presently used in state of the art approaches for large security installations. Such controllers greatly reduce wiring costs, complexity and protection problems while also supporting the control of sensors and actuators in physically remote buildings. Further, the remote controllers have enough stand alone programming to provide simple functions even in the event of failure of the centralized processor or disruption of the data link between a remote controller and the central processor.

Such control computers are available from many sources and essentially consist of single board instrumentation computer 200 with microprocessor 223, read-only memory for programs 225, read-write memory 222 for working data; and a number of various input/output interfaces 201, 210 to enable the remote controller to directly monitor and control clusters of sensors and actuators as indicated in FIG. 1.

The primary power for the remote controllers is provided by a local plug-in power supply. A back up battery at each remote controller assures continued operation in the event of a loss of primary power. It is immediately understood that the power for the remote controllers as 30 31, 32 are independent from the power provided to the environment and security processor 35 as well as its attendant modules.

This modular approach as shown in FIG. 2, by the use of the remote controller as 30,31,32 interfacing with the ESP 35, also allows almost unlimited capacity for growth by simply adding more interfaces or additional remote controllers.

Thus, in regard to the system shown in FIG. 2, the emergency action system employs distributed architecture and fall-back manual controls which assures operability even in the face of catastrophic events, as will be further explained. Thus, the system responds effectively to the real world concerns of facility security.

The modular nature and construction of the system minimizes cost, simplifies logistics and maintenance and allows the system to evolve to take advantage of smarter, faster and cheaper technology in the future. The entire apparatus may be implemented on a relatively simple basis, but it can grow to almost unlimited size as it has the capability of handling a wide range of facilities. Therefore the unit can interface with additional devices as the threat environment grows more complex.

Most of the physical components of the user consoles and of the security and control subsystem are conventional standard components, widely available and interchangeable with others of similar type. For instance, computers that form the heart of both the user consoles and security and control subsystem are commercial "personal computers"; and displays are standard color video monitors. Such standard components are fully integrated within the system configuration via specialized interfaces and software programs, as will be further ascertained.

Figure 4:
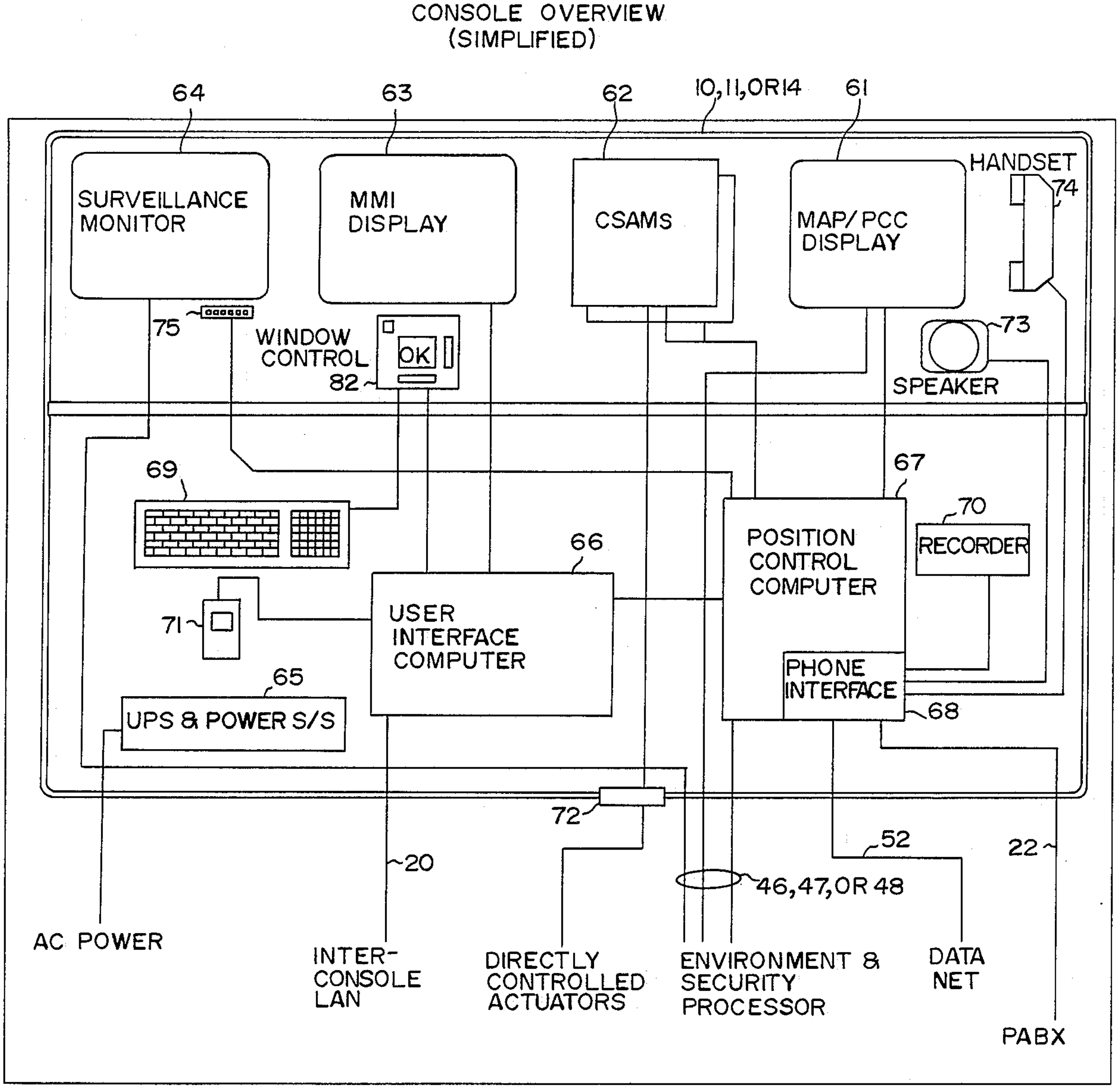
FIG. 4 is a block diagram of a typical console as implemented by the apparatus of this invention.

Referring to FIG. 4 there is shown a block diagram of a typical user console employed in this emergency action system, as for example the guard post consoles 10 and 11 or command center console 14 of FIG. land 2. As indicated earlier, it is understood that the system as described can be equipped with a mix of user consoles selected to meet specific installation requirements while the generic components of each of the consoles, as shown in FIG. 4, are employed.

Each of the consoles, as will be explained, function to provide access to the security and control subsystems in the way of the sensor/actuator control, alarm display, and surveillance video. Each console will allow supporting communications control, such as voice and data, and managing data bases, such as phone book and conference listings.

As seen in FIG. 4, a major module associated with the console 10, 11, or 14 is a position control computer 67. This computer is of the same type as for ESP35 as above indicated. The position control computer, in addition to coordinating the activities of the other system components, provides most of the external interfaces for the console.

The position control computer 67 operates with a multi-line telephone interface 68 which connects the console via circuits 22 to the PABX 21 or commercial telephone network. This interface allows the console to make and receive multiple simultaneous calls, and to switch such calls internally to the handset 74, speaker 73, recorder 70 or to any specialized signal processing equipment that might be associates with the console.

This interface also allows the recording and play back of conversations and messages within the hardware of the position control computer 67. The multiline telephone interface 68 is available from Dialogic Corp. of Parsippany, NJ as the Dialog-41.

The position control computer 67 supports numerous data interfaces, including ones to the environment and security processor 35 and external datanet of FIG. 2, and the user interface computer 66, circuit status/access modules 62, and surveilance monitor controls 75 of this figure.

The position control computer 67 also exercises override control of the color CRT display 61 which is normally used to present the alarm MAP from the ESP 35, and continuous digital date/time display which is associated with the console.

The user interface computer 66 is dedicated to supporting the user interface of the console. The user interface computer 66 is the primary channel for user interaction via the associated display 63, a mouse or track ball 71, and both standard and specialized keyboards 69. The display 63 employs high resolution color graphics to provide modern windowing techniques. The user interface computer 66 also interfaces with a touch screen or window control pad 82 which enables the guard or console operator to interface with the MACC display 63 as will be explained. This computer therefore provides an environment that permits the console user to deal with several activities simultaneously with a minimum of training and experience. The user interface computer 66 is a MacIntosh-II personal computer available from Apple Computer Corp.

As seen in FIG. 4, there are one or more circuit status/access modules or CSAM modules 62 included in the console. Each CSAM is an intelligent control/display modules which provides 32 user-programmable function buttons. A consoles can contain up to 10 or more such modules 62. These modules are managed by a dedicated control microprocessor FIG. 17, associated with the first CSAM, which scans the buttons, signals user activations to the position control computer 67 and receives back display commands.

Using the user interface computer 66, the user can program the console to treat a CSAM 62 button press as a command to place a call or conferences, run a crisis response check lists, operate remote actuators or invoke specialized customer-programed functions. Each CSAM button also includes a white lamp in the button, plus red, amber and green indicator lights; these are used by the position control computer 67 to indicate status of the circuit or function associated with the button.

Each CSAM button also has an additional switch contact which is brought out to a patch block 72 at the console interface panel. Such switched contacts interface with the manual patch/switch and display panel 33 of FIG. 2 to allow direct control from a console of actuators or sensors. These direct, manually switched contacts can be used for direct control, for quickest possible response, and/or fail safe operation even in the face of catastrophic failure of other console components. Since a command center console 14 can be configured with up to ten CSAM modules 62, over 300 individual circuit functions can be supported at a single console.

As further shown in FIG. 4, the user interface computer 66 interfaces with the interconsole LAN cable 20, as for example shown in FIG. 2. The user interface computer 66 also processes and distributes information to the position control computer 67.

The power distribution subsystem 65 is a commercial power supply which is adaptable for 120 volt operation or for foreign operations. The primary role of the power subsystem 65 is to fuse, filter and distribute AC power. Each major component of the console includes facilities to convert from commercial AC to DC as needed to operate the component. The power distribution subsystem 65 also provides a panic switch for quick shutdown in the event of fire or other emergency. This switch may be one of the switches located on the CSAM panel 62. The power subsystem 65 also includes an unterruptable power supply which will provide approximately 30 minutes of operation of all console components in the event of the loss of the primary AC power to the console. If longer outages must be tolerated, the power supply can also include a DC to AC inverter to back up during these conditions. The inverter is driven from a typical external battery facility and such an inverter can operate the console unit for several hours during power failure.

As will be further explained, the modular design of the console in regard to hardware and software, as of FIG. 4, allows the console functionality to be repackaged for special requirements. For instance a mini console, provided as an administrative work station for the security officer, can also act as an additional limited capability console. Such a console would consist of the user interface processor 66, with display 63 and peripherals 69, 71; one CSAM module 62, and a single line phone In accordance with the modular nature of the design, the system uses standard RS-232 serial channels for the control/data interfaces from the environment and security processor 35 to the consoles as 10, 11 and 14 of FIG. 1 as well as to the remote controllers, to security devices 30 which may be microprocessor controlled, and to any remote logging printers via modems 36. Thus, inexpensive standard data cables can be used. For better security, fiber optic links can be provided.

The video signals are distributed at standard RS-170 video levels. Again, inexpensive coaxial cables or secure fiber communications are off-the-shelf options.

The sensor/actuators are generally connected to the patch panel 33 and remote controllers 30, 31, 32 via dedicated twisted pair wiring, shielded as needed.

The consoles telephonic subsystem connects to any PABX or telephone central office as a bank of standard telephones. Up to eight ports to the host switch can be configured, each emulating a standard single line telephone.

Essentially the structure provided is a core console product that needs to be viewed as a viable system integrator and which has applicability to a large variety of installations or facilities. The console can be employed, for example, in highly secure facilities such as embassies and consulates or security defense locations. While such locations are desirable, it is also understood that the technology could be utilized in general security applications for use in central monitoring centers and large security installations such as large office buildings, factory buildings, banks and so on.

Figure 5A:
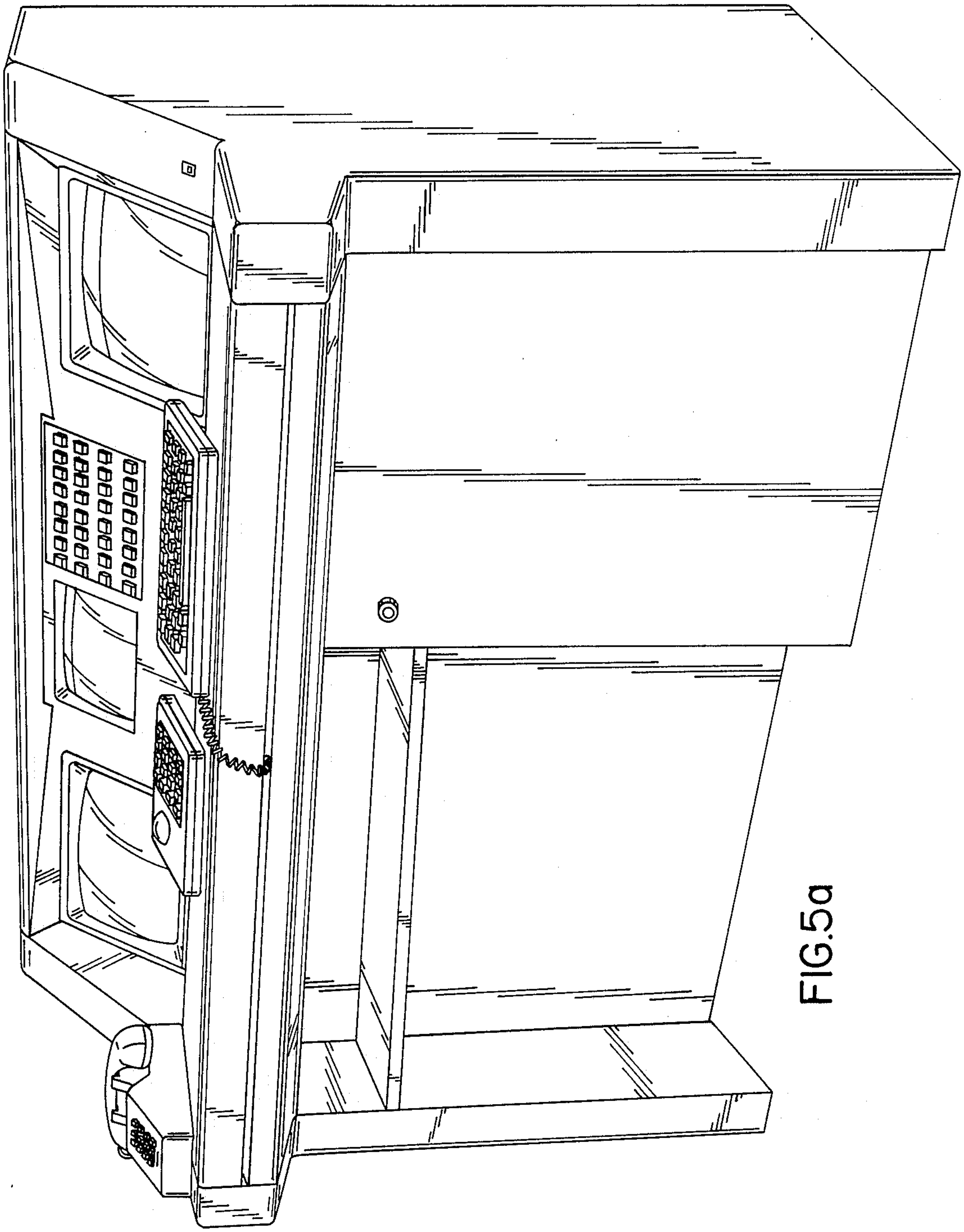
FIG. 5a is a pictorial representation of a prototype of a typical user console arrangement as implemented according to this invention.

Referring to FIG. 5 there is shown a pictorial representation of a typical console utilized in this system. The configuration, as shown in FIG. 5, is merely illustrative of a console format and it is understood that many other designs and configurations can be employed. Before proceeding with a brief explanation of FIG. 5, it is understood that the same reference numerals as utilized in FIG. 1,2 and 4 have been employed to depict the various components shown in FIG. 5. As seen in FIG. 5, there is shown a guard post console, which is the console as 10 and 11 as for example shown in FIGS. 1 and 2.

Item 64 shows the surveillance monitor, as for example monitor 64 of FIG. 4. The unit 64 is available from Magnavox Observation Systems, Part Number MC3510ALOl. This monitor is essentially a CRT screen which is located on the front of the console in order to enable the operator to view the presentations as displayed. Reference numeral 63 depicts the user interface computer display which is a high resolution graphic display as a CRT device. Also shown is a dialing function keypad 90, which is an adjunct to the keyboard 69 of FIG. 4. As will be explained, the function of the keypad 90 is to allow the guard or console operator to dial into the telephone system and to monitor or to communicate via the handset 74. Also shown, and indicated again by reference numeral 61, is the alarm map monitor which corresponds to the map display 61 of FIG. 4. It is understood that this module enables the guard or console operator to view map or diagrams of the premises being monitored, as will be further explained.

Reference numeral 62 refers to the CSAM module which, as indicated above, is associated with a number of switches or push buttons shown for example in the diagram in a general view. Each key or push button is associated with the circuit status/access module 62. Essentially, by operating a key on the CSAM 62, the guard or console operator can implement control functions.

Figure 5B:
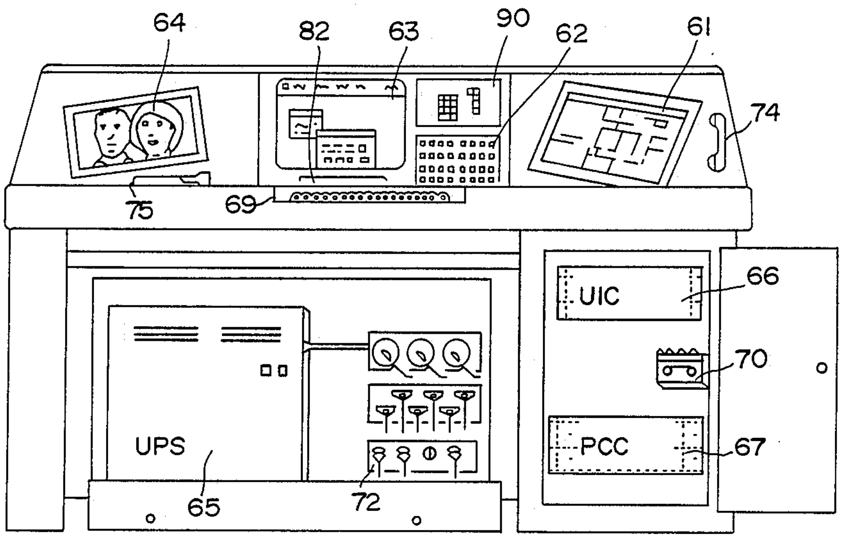
FIG. 5b is a perspective plan view of such a typical console.

In FIG. 5 it is seen that relatively centrally located is the MACC display 63 which is associated with the user interface computer 66 which is contained within the console housing. The user interface computer 66 is associated with a keyboard 69, and a mouse 68 (not visible in FIG. 5*b*). The central location of the MACC display 63 is desired due to the interaction capability of the user interface computer. As indicated above, the display 63 utilizes high resolution graphics and as indicated is mounted in the center of the console to present to the operator a dynamic display of status and controls using windows and "icons". These terms, as well as the details of this particular segment of the console, will be discussed in greater detail.

As shown in FIG. 5, in addition to the function specific controls provided by the icon, windows and on-screen menus, the display 63 also directly handles most of the user input devices. As indicated above, the display 63 interfaces with the user interface computer 66 and allows the use of the window control pad 82, the mouse 68, the text numeric keyboard 69 and the dialing function select pad 90. It is indicated that the keyboard 69, as well as the mouse 68, are not normally visible on guard post consoles and can for example be placed in a console drawer.

The window control pad 82, which is mounted below the display 63, provides quick, simple interaction with the on screen windows and control. As indicated above, both the guard post console as 10 and 11 and the command center console 14 utilize similar components, and the window pad control is present on both console versions. The pad control 82 is the primary user input device at guard post consoles. Command center console operators, on the other hand, usually use the mouse 68 more frequently. Movements of the mouse on the work surface, or finger on the control pad, are matched by movements of the on screen cursor. The movement of a cursor by means of a mouse or pad is a well known implementation in regard to many prior art software programs. When the cursor is pointing to a window or on screen control, pressing the mouse button selects that window or activates the control as is known in the prior art.

The text keyboard 69 is provided to enable a guard or other user to enter alpha/numeric information, for instance to enter inputs to administrative logs. This keyboard is also useful to search through the electronic telephone directory which may be stored in the user interface computer 66. Although scrolling keys on the window control pad can be also used for such a search, it is generally quicker and easier to simply type a few characters of the desired name, phone number, on the text keyboard 69.

The dialing/function select pad 90 is mounted to the right of the MACC display 63. This key pad provides a numeric pad for rapid telephone dialing plus function keys to access the major functional capabilities in the console as for example automatic directory and key personnel status (ADKPS), sensor/actuator control, check lists, conference notebook and so on.

As indicated above, one CSAM module 62 has 32 buttons. Each of the buttons is programmed by the security officer to activate a control, call an individual, organization, or conference, execute a check list or invoke an application unique function program for that particular system. Associated with each CSAM button is a set of three colored lamps (red, green and amber). These can be used to indicate the status of the associated function circuit and so on.

As indicated above, most guard consoles will have only one CSAM module which means they will have 32 buttons. More than this would tend to confuse the user and hamper the rapid response to crisises. However, if circumstances require, additional CSAM modules can be mounted. For example, for rapid access to a greater range of frequently used functions and key individuals, a command center console will normally have two CSAM modules totaling 64 buttons. If even greater capacity is needed, wings of additional CSAM modules can be mounted at either or both ends of the console. Thus a fully expanded command center console can have ten CSAM panels or 320 buttons.

The monitors 64 and 61 are also present on the console. The left monitor 64 is normally used to present the imagery from surveillance video cameras as for example shown in FIG. 2 as the surveillance monitor. This includes switches to select specific views and camera controls 75 which switches or controls are mounted beneath the display 64. The right monitor 61 presents a map of the building showing the particular types and locations of alarms and is referred to in FIG. 2 as the map display 61.

The environment and security processor 35 (FIG. 1) is controlled by means of a detachable keyboard and is associated with a color video display 34. Except for maintenance the keyboard is kept locked in the ESP cabinet, while the display presents a central alarm map which is the same image as for example presented on the display 61 of the consoles. Since this alarm map is generated using standard video levels, it can be made available on repeater monitors elsewhere in the facility. In particular it is apparent that this signal can be routed to a monitor for the security officer and to one in a situation room where senior staff gather to manage major events.

Essentially, as one will understand, the user interface is based on principles developed by many existing computer companies for personal computers. This software is widely available and for example is the type of software utilized on APPLE computers for the LISA/MACINTOSH family of advanced personal computers. As indicated, the focus of the console is the display 63 which interfaces with the user interface computer 66. The MACC display 63 provides a high resolution graphics display upon which the application software can display and manipulate objects portrayed. The display provides a desk top analogy which provides a working environment that users already are acquainted with and know how to manipulate as for example a desk full of papers and devices. Thus, by using the simulated desk top display a user requires only a few minutes learning how to use a few controls, for example the mouse 68 or the window control pad 82. These are utilized to select and manipulate the items and papers which are the icons and windows on the desk or on the display.

A computer aided instruction program provided with the system gives the user a hands-on introduction and some simple drills. Once the basic concepts are grasped the console operation quickly becomes second nature and an on line HELP facility is available to quickly refresh the user's memory on infrequently used capabilities.

Figure 6:
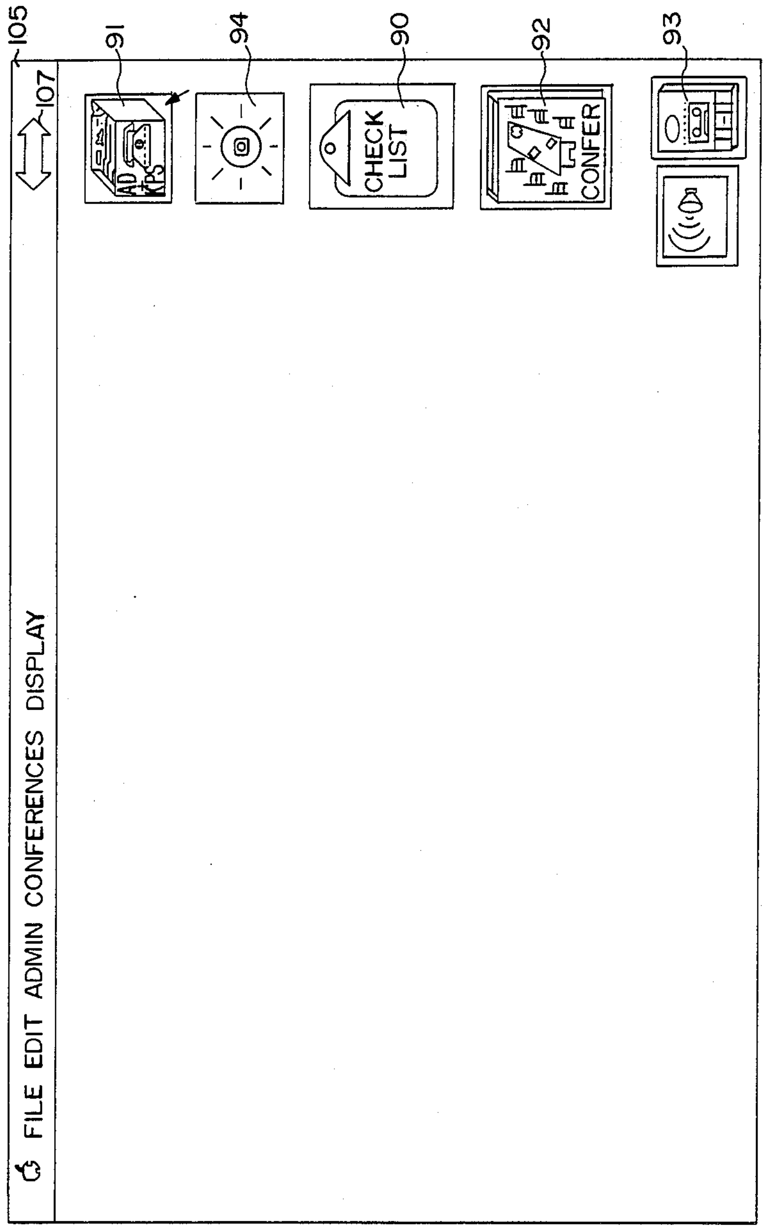
FIG. 6 is a display which will be generated on one of the console display units by the user interface computer according to this invention.

Referring to FIG. 6 there is shown a typical display which appears on the display 63. As seen in FIG. 6, devices on the simulated desk top are represented by icons which essentially are small pictures properly labeled that work like on screen buttons to enable access to specific system functions or displays. Among the useful devices represented on the display by icons is a clipboard 90 which bears the nomenclature checklist. By accessing the checklist icon 90 by means of the mouse or by means of the window control pad, the guard or console operator is provided with a list of procedure checklists, from which he may select the desired one. There is shown a card file icon 91 for individual and organizational phone numbers. There is also shown an icon 92 to enable the console operator to access a conference "notebook". There is shown an icon 93 which appears as a recorder and will allow audio recording and playback of messages or conferences. There is an icon 94 which is an alarm display and so on.

The icons, as shown in FIG. 6, have several significant advantages over a traditional menu or command line user interface. As one can understand, the picture communicates its meaning to the user more quickly and directly than a text description and usually in less space. When several options must be presented, a user can visually pick out the desired selection from an array of icons much more rapidly than from a list of text descriptions and therefore the user can select a function directly rather than mentally translating the same.

As shown in FIG. 6, the user interface computer display 63 is divided into two areas: the working desk top area, which was just discussed, and a menu bar 105. While the desk top area is dynamically used to display various function windows, the menu bar provides access to broadly applicable but infrequently used functions. Thus, the word File stands for file control, the word Edit for text edit functions, the word Admin for administration capabilities and the word Conferences to conference control. These functions are accessed by using the mouse 68 to pull down the desired menu and then making a proper selection.

One can also provide, via the above-type programming, smaller programs called "desk accessories" that are run by the user interface computer 66 and can be run in parallel with the main applications. Thus one can access commercial desk accessories, as for example a calendar, alarm clock, note pad and calculator. These accessories are provided directly on the display 63 and are conventionally known and employed in many software applications.

As seen in FIG. 6 to the right end of the menu bar there is shown an arrow 107. This arrow is shown in icon form and is implemented by means of standard programs which allow the display to rotate to bring up larger commercial programs. The most frequently used of such programs is a text/graphics terminal program sold under the Trademark VERSATERM which allows access to graphics or textual data that can be stored on other computers to which this system can connect. It is of course noted that it would be possible for the security officer to install other commercial or custom programs in this rotation, for example data bases, 3-D graphics, electronic mail and so on. Even when the user interface computer in the console is running such a program, normal security control and communications functions are still operating and available.

Figure 7A:
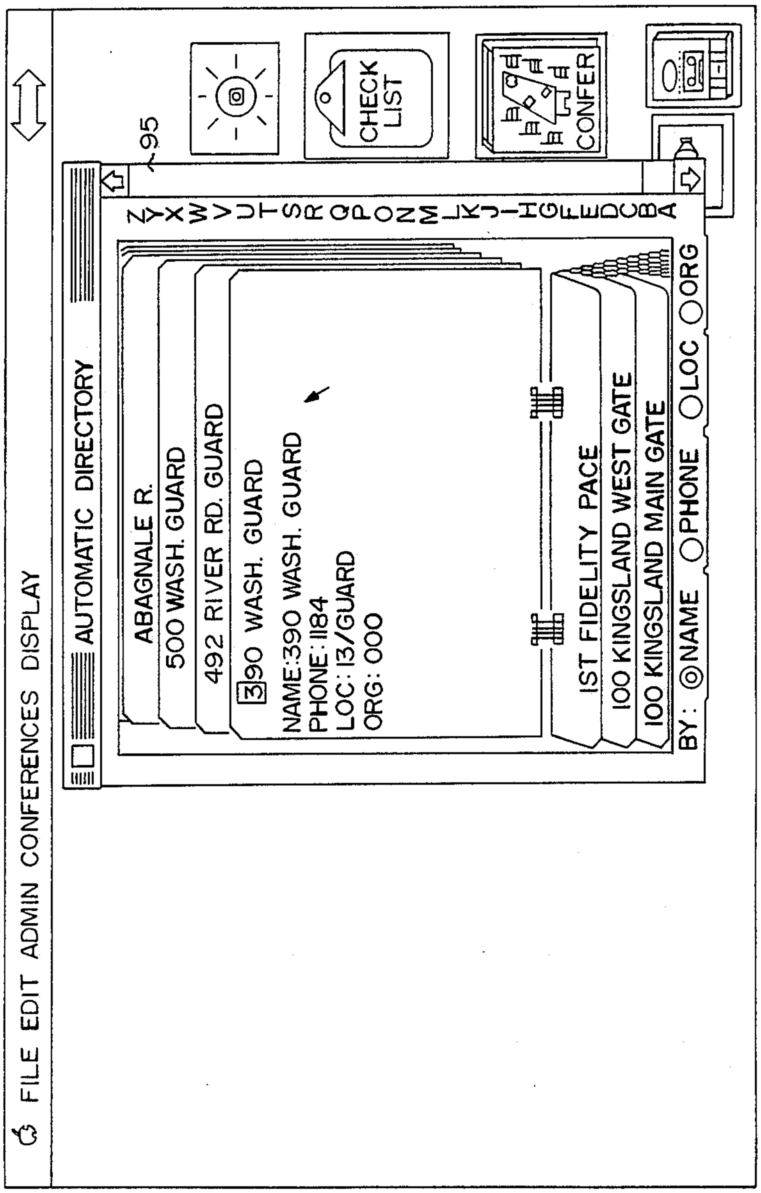
FIG. 7A is an example of another display which is generated at the console upon accessing a particular icon as shown in FIG. 6.

As shown in FIG. 6, each major function is associated with a "selection" window or icon. Referring to FIG. 6 there was shown the icon 91 which when operated causes the automatic directory display 95 of FIG. 7A to appear and the icon 91 to disappear. The visual effect is of the icon "opening up" into the larger display. As shown in FIG. 7A, the display 95 is superimposed over basic desktop display. These functional displays are like sheets of paper on a desk, and multiple such displays can be stacked up. To bring the desired one to the "front", the user simply selects it with the mouse or window control panel.

Figure 7B:
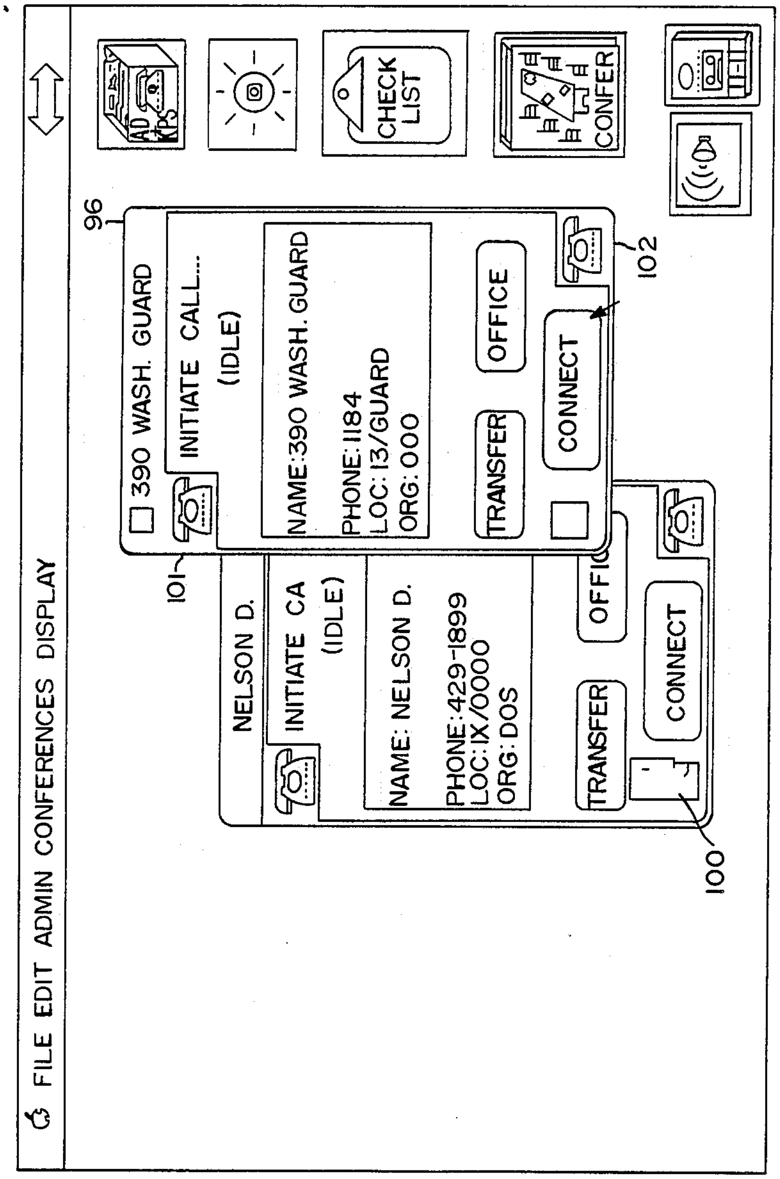
FIG. 7B is a display which can be accessed by referring to the display of FIG. 7A.

As seen on the right of display 95 the display can be accessed in alphabetical order. Each person and organization associated with the facility is listed. Once an individual is selected a separate display for that individual can be accessed as shown in FIG. 7B, which shows the display card 96 for "390 Wash. Guard" as selected in FIG. 7A. As is known and as can be implemented by standard software, each major function, as for example represented by the icons on the display of FIG. 6, has a selection window. Once the selection window has been used to identify a particular member of the class, the selection window will shrink back to its icon and a detail window of FIG. 7B will appear to provide member specific information and control functions. For instance, actuating the ADKPS via icon 91 will result the selection window 95 of FIG. 7A; selecting an individual will in turn result in a matching subscriber card 96 shown in FIG. 7B being pulled and placed on the desk top of the display 63. This card 96 allows placing a call to the person either with or without key personnel status and to display the status of the call. It also allows calling up a digitally stored image of the subscriber if a face icon is present 100 in the lower left corner of the card and also permits reopening the automatic directory at this person's entry using either of the phone icons as 101 or 102 shown at the upper left and bottom right corners of the display 96.

In most cases, as is known, there can be multiple detail windows of a type displayed at once. For instance the console user can pull several subscriber cards 96 either for making multiple independent calls or as a precursor to asking for an on-the-fly conference. Other selection and detail windows provide other functions as for example sensor events, sensor/actuator control, preset conferences as shown in FIG. 6.

Essentially, as noted above, a major aspect of the system is to enable a guard to support effective crisis management. In order to do so the system must provide tools or programs for (1) developing plans in advance to deal with a particular situation, (2) detecting a situation and detecting the appropriate response plan, (3) timely intelligent flexible execution of the plan while (4) continuing to handle a central routine function and possibly other crisis response plans. Thus the system must integrate administrative and engineering capabilities for planning sensor and surveillance functions for detection and computer interactive control of actuators and communication capabilities. This is done in order to provide a coherent responsive system for efficiently managing crisises.

Thus, in regard to advance planning, once a threat situation has been proposed the first step is to evaluate the threat and plan an appropriate response. Evaluating the threat requires gathering and organizing all possible information about the nature of the threat. The advance voice and data communication capability of the system allows a security officer to tap multiple sources to verify the nature and seriousness of the threat. To aid in organizing and integrating this information many commercial packages, as data bases, 3-D architectural graphics, organizational tools, artificial intelligence packages and so on can be provided with the system. If a threat is determined to be real, a response must be planned. The first step in this planning is to outline the major steps that must occur. The outline editor included as a standard component of this system is used to develop such an outline. Each step in the checklist is then determined detailing both human and system actions that must occur. The outline editor facilitates this process by allowing the security officer to view the top plan level, then zoom in and out to deal with details. If the threat is similar to one already planned for the editor also allows review of existing plans and copying those for editing.

Figure 8:
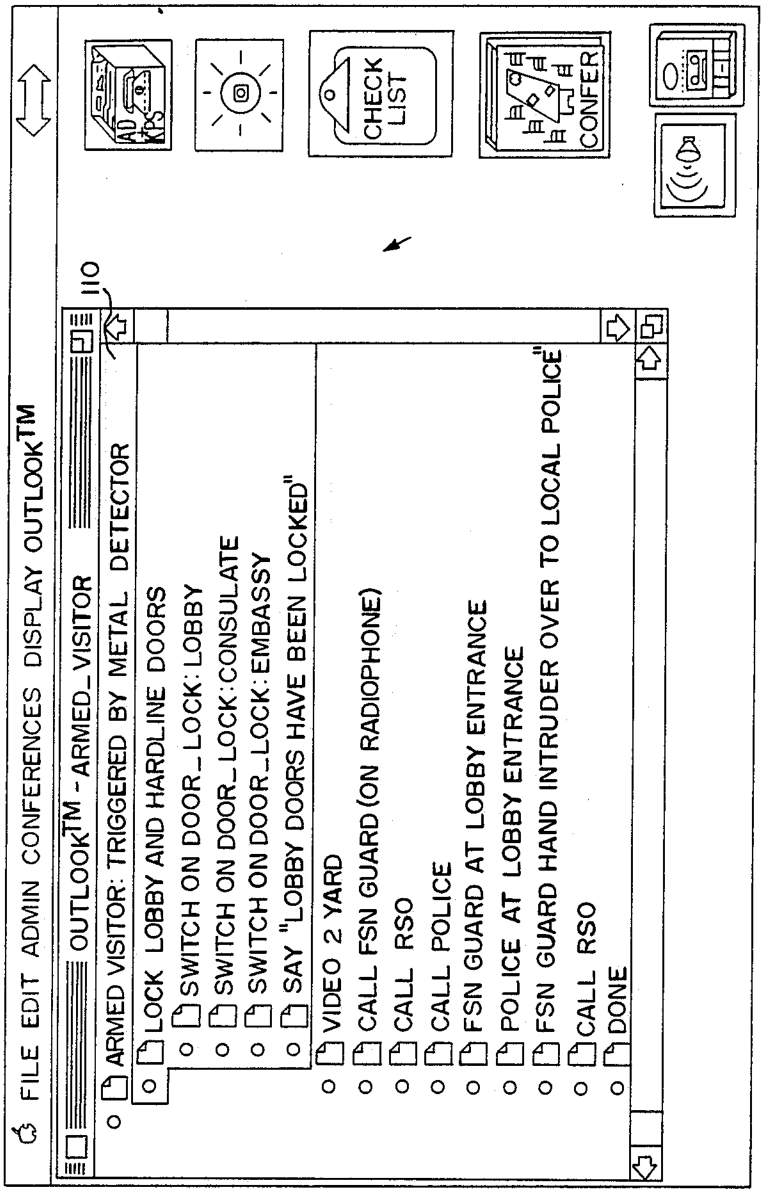
FIG. 8 is a diagram representing still another display which can be provided by this system.

Referring to FIG. 8 there is shown a display 110 which essentially describes a plan and check list for armed visitor being detected. This is the type of display provided by the system and which type of display can be implemented by many known and existing software programs. Thus, when building a checklist from existing programs, actions are specified as English-like commands. The following is a partial list of the available command verbs.

OK "prompt" Wait for user to acknowledge
YES "prompt" Wait for user to make yes/no choice
NO "prompt" indicating normal "best" choice.
OPTION "prompt" Wait for user to make 1-of-n choice.
,optl...
,optN
CALL subsc-specCall specified subscriber/initiate a
CALL conf-spec conference.KPS redirection available
CALL RELEASERelease call/conference
SAY "prompt" Prompt user to make announcement
PLAY vox-file Play previously recorded message
DTMF string Generate Touch Tone digits.
DISPLAY crt Route video from "source" to
source specified "crt" display
ENABLE sensor-nameControl sensors or actuators
DISABLE sensor-name
SWITCH on/off/pulse actuator-name
LOG "message" Log the message on ESP printer/-disk
CHECKLIST chklst-name
Execute a lower-level checklist, then return to continue with current one.

The checklist commands listed above allow access to all of the systems communications control and surveillance capabilities; prompting the user for a decision or manual action; and even invoking subordinate checklists. Furthermore, the software design is such that additional function verbs can be easily added if required to respond to application unique requirements.

The execution of a pre-planned crisis response checklist can be initiated in any of a number of ways, depending on how the threat is detected, and how quickly the initial response is required.

For very time-sensitive responses to mechanically detectable events, a checklist can be directly associated with a sensor event (in the Security and Control Subsystem's database). For instance, the "armed visitor" checklist, triggered by a walk-thru weapon detector can — instantly and without any manual intervention — lock all lobby doors. Having secured the area, the checklist then in FIG. 9 begins to step the guard through the process of determining if the visitor really presents a threat; and if so, neutralizing it.

For time-sensitive responses that require a human to detect, e.g., an unruly but unarmed visitor, a checklist can be invoked by pressing a CSAM button as on the panel 62 of FIG. 5B. Depending on how the checklist was programmed, it might take instant action; or it could first interact with the user for confirmation. This latter capability is especially useful for dangerous controls. For instance, rather than directly wiring a CSAM button for tear gas release, the button could be programmed to invoke a checklist that would first demand reconfirmation; then seal off ventilation before actually releasing the tear gas; and finally walk the guard through a reporting procedure (e.g., call the Security Officer).

If a checklist responds to a less time-critical situation, the normal mechanism for invoking it is via the Checklist Selector Window. This window presents an alphabetical list of all checklists available on the console display. Since the total number is limited only by the size of the installed disk, logical "folders" are used to group related checklists or hide infrequently used ones. Furthermore, the selector window presents the opportunity to insert a floppy disk. This allows separately stored checklists; for instance, a disk with checklists that contain sensitive or classified information.

Figure 9:
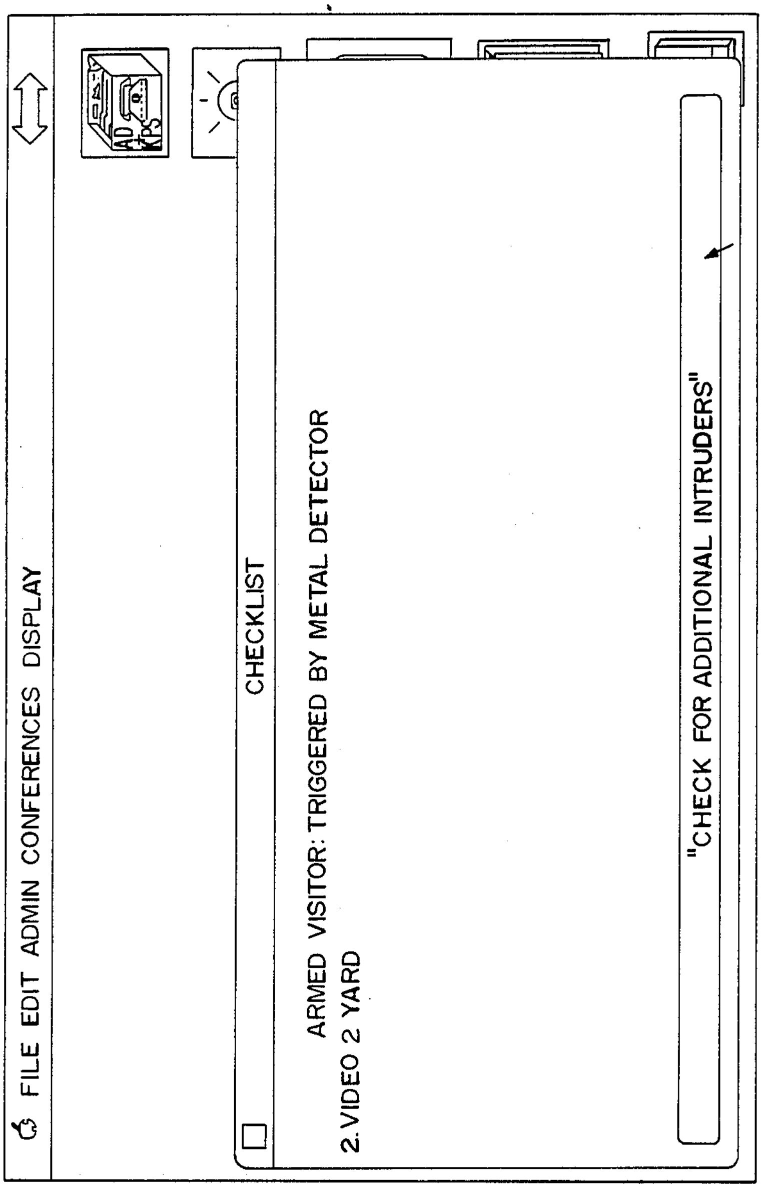
FIG. 9 is a diagram depicting a display indicative of a checklist mode provided by this system.

Regardless of how invoked, an executing checklist presents an interaction window on the MACC screen 63. The MACC or user interface computer 66 executes the preprogrammed checklist steps automatically until it reaches a step that requires user interaction (confirmation, yes/no decision, one-of-N choice); it then presents the programmed prompt on the display 63 and waits for the user to accept the "default" (indicated) choice, or make another selection. Execution then continues. FIG. 09 shows a typical display for program prompt "Check for additional intruders".

At guard post consoles, the most frequent mechanism for controlling an executing checklist will be the Window Control Pad 82 the "OK" button on the pad indicates acceptance. If the checklist was invoked via the CSAM, the CSAM button acts as an alternate "OK" key. At command center consoles, the space bar on the text keyboard, and the mouse, provide additional confirmation mechanisms; and the mouse and on-window buttons can be used to select alternate choices.

Multiple checklists can be executed in parallel: for instance, dealing with a fire and a power outage. Both the Window Control Pad 82 and the mouse 68 provide ways for the user to alternate between two or more checklists; as well as to continue to exercise all the other control and communications capabilities of the system.

Thus, the checklist functions provides a sophisticated, yet easy-to-use, capability for planning and executing crisis management. By integrating pre-planned automatic actions, the ability to request and act on user decisions, and the capability to continue to perform all normal control and communications functions, the system's checklist function provides instant response to time-critical situations, yet permits the user to exercise on-the-spot judgment.

The system responses are event- and user-driven, and capable of handling several activities simultaneously.

This approach is radically different from traditional menu or command line based systems. Thus, it is not possible to provide a set of menus or messages and say "This is what you will see, in this order." Instead, the user interface can be specified for each functional window, by showing the window and describing the reason it appears, what it shows, and what options it offers.

Note that the more global decision of which of the windows currently on display should be dealt with "next" is left to the user. The system attempts to cue the more important events to the user: for instance, alarms appear "in front of" administrative windows. But the final judgment of what is really important is made by the console user.

Figure 10:
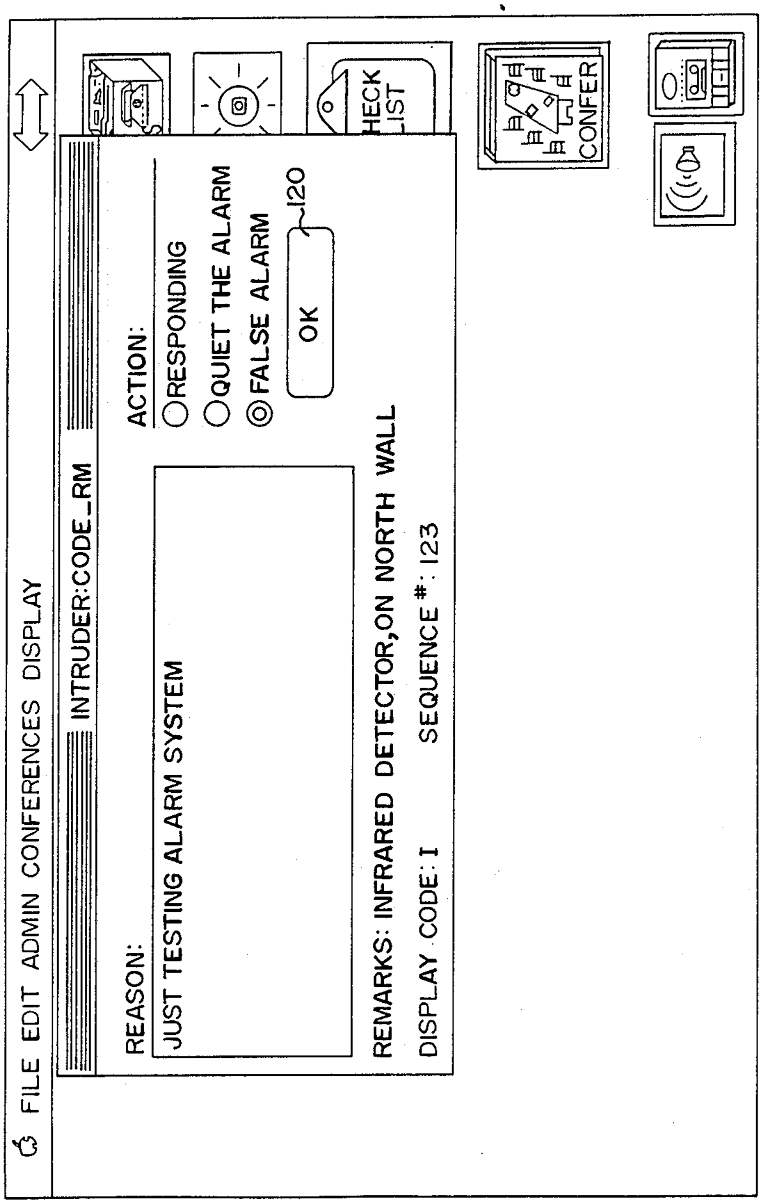
FIG. 10 is a display indicative of an intruder alarm display according to this system.

The window shown in FIG. 10 appears automatically whenever a sensor registers an abnormal event. In addition to this visual display, an audible alert will sound, then the speech synthesis function built into the user interface computer 66 will be used to announce the event. The FIG. 10 display shows that an infrared motion detector, on the north wall of the Code Room, has detected an intruder. Three action choices are presented:

1. To indicate he is "Responding" to the alarm (the default);
2. To ask the system to "Quiet the alarm"; or
3. To log it as a "False Alarm". (If the user "quiets" a sensor, events from it will continue to be logged by the system but the console will not display or announce them.).

The "Reason" block provides a text area where the user can enter a short note explaining his choice. The "display code" indicates that, if the user refers to the alarm map display, 61 of FIG. 4 or 5 he will see a flashing red "I" in the code room. The sequence number indicates that is the 123rd alarm event recorded.

If several independent events have been noted, there can be several of these windows on screen; however, the system will suppress repeated alarms from the same sensor.

When the user chooses his response and hits the "OK" key, the choice (and reason, if given) will be logged at the environment and security processor 35 (disk 37 and hardcopy 38). This window will then disappear.

Figure 11:
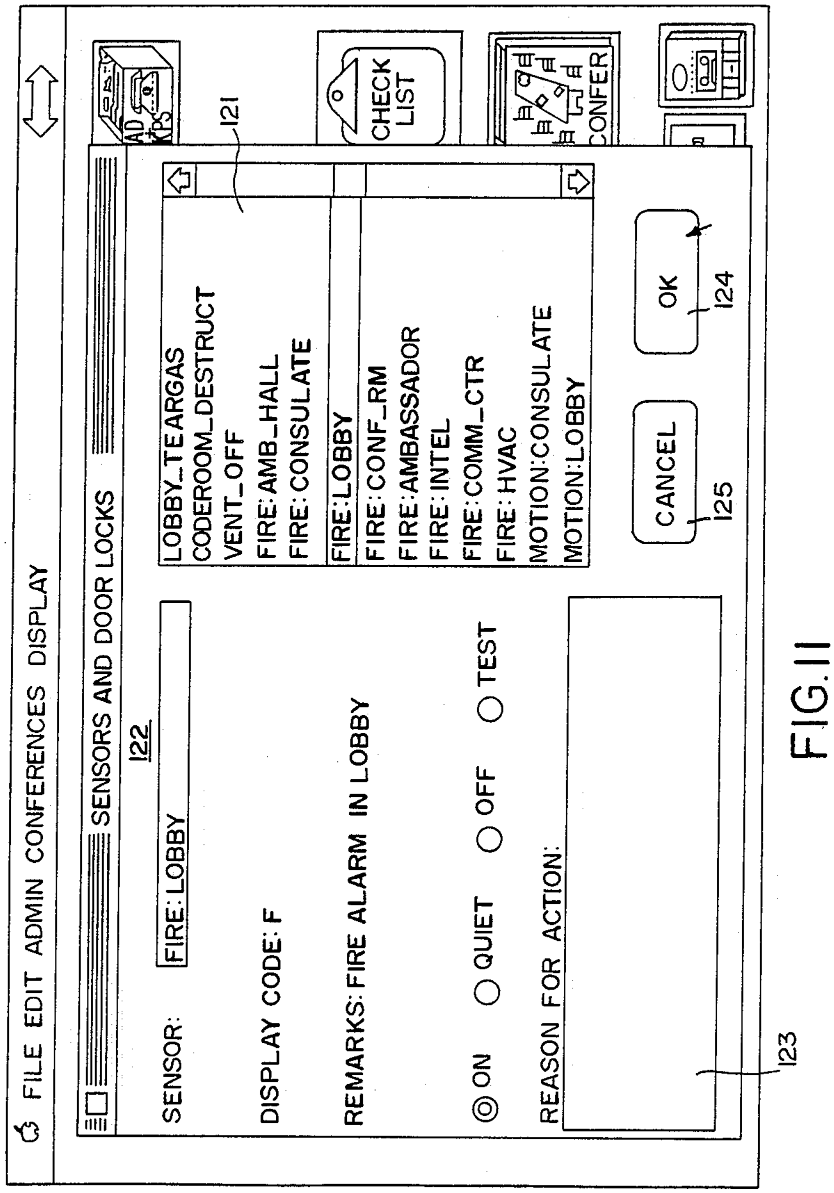
FIG. 11 is a display provided by this system indicating the location and description of various sensors which are employed in an intrusion detection system operating with this invention.

Referring to FIG. 11, this display allows an authorized user to enable, disable, or test sensors and actuators; and to centrally control any actuator. The area 121 at the right lists all available devices; since this is typically a long list, the scroll bar is provided to facilitate movement. The list is presented in order of the sensor/actuator definition file, so that like items can be grouped together. The currently selected device is highlighted (FIRE:LOBBY).

Rather than a separate "detail" window, the left portion 122 of this window gives details for the selected device, and offers appropriate choices for change. There is a text area 123 for logging an explanation. When the user hits the "OK" key 124, the change will be made and logged. To abort without action, the user ,clicks, the close box or CANCEL button 125 on screen.

Figure 12:
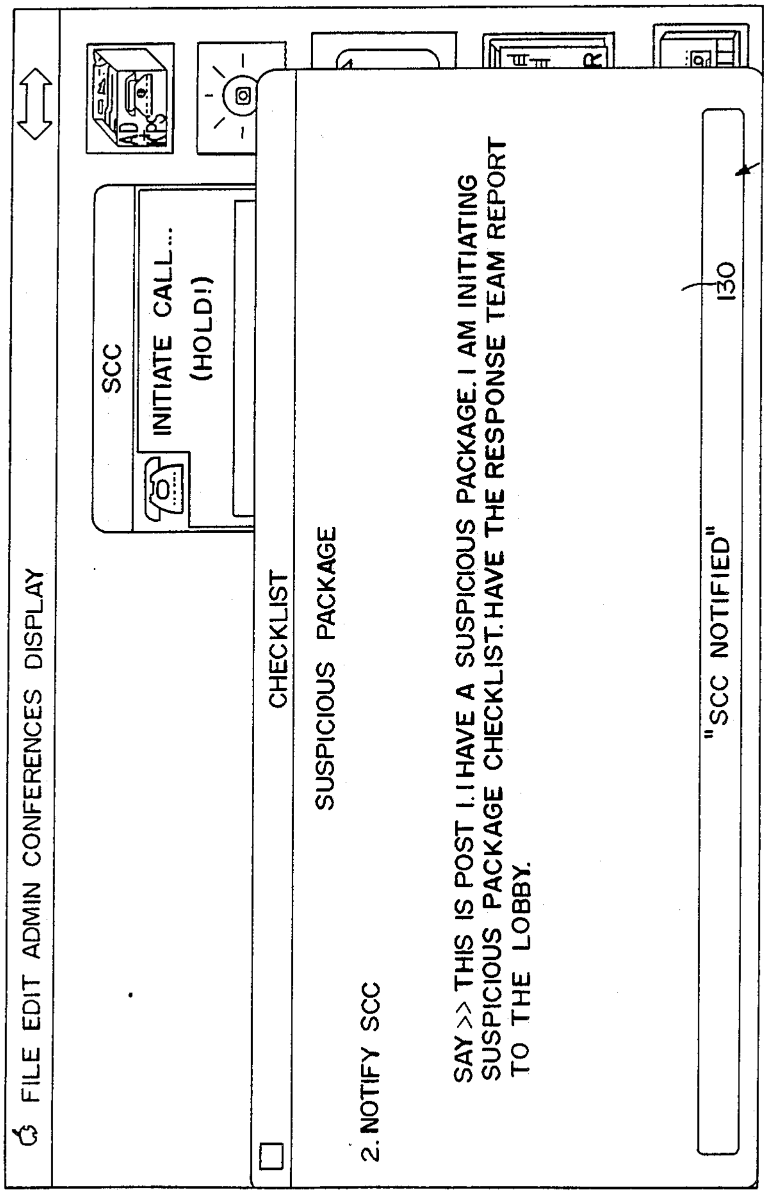
FIG. 12 is a display depicting a further checklist format.

Referring to FIG. 12 this display 130 shows a checklist in execution. In the example, we are at step 3 in the "SUSPICIOUS PACKAGE" checklist: "Notify SCC" (Security Control Center). The system will have already placed a phone call, and is now prompting the user with a statement he should make to accomplish the notification. By providing such a "cue card", there is less chance that an important part of the message — for instance, asking for the response team to report — will be forgotten. When the step is complete ("SCC Notified"), the user would hit the "OK" key on the pad or CSAM panel. The system will then release the call, and continue processing the checklist until another user or decision is needed.

Figure 13:
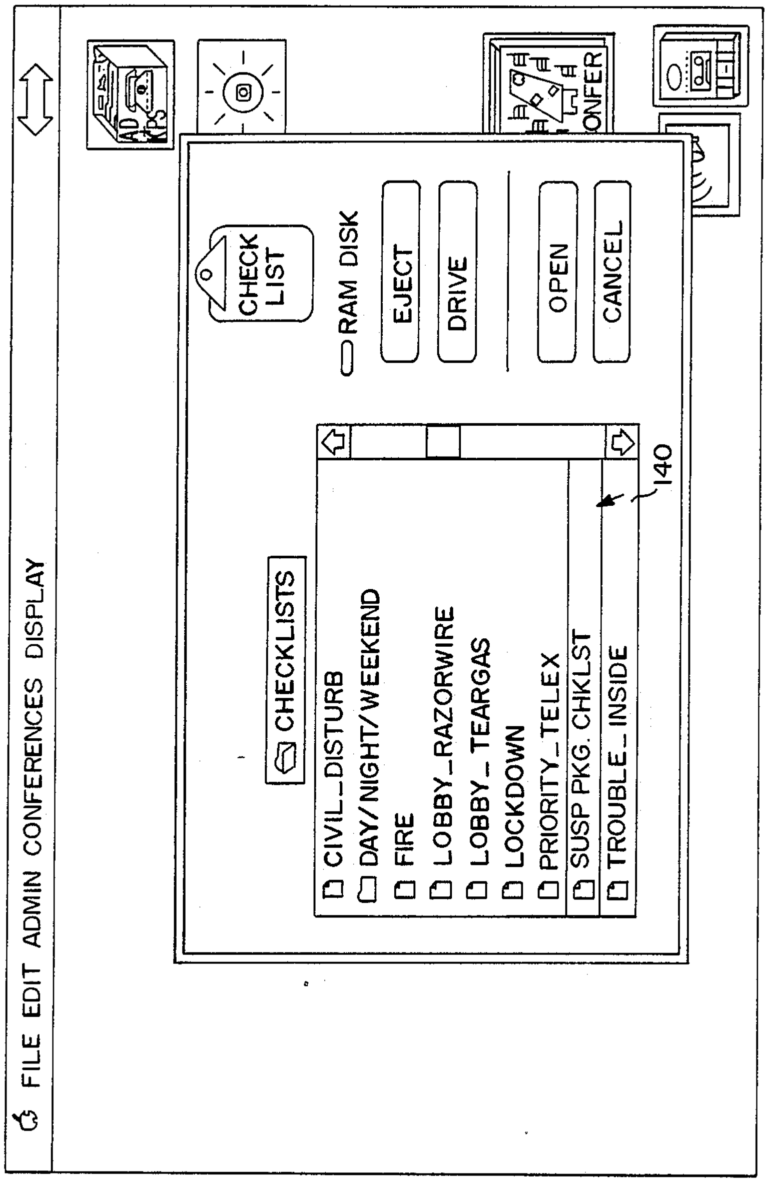
FIG. 13 is a diagram of another display provided by this system.

Critical or frequently used checklists will normally be invoked either via a CSAM button, or automatically in response to a sensor event. The window of FIG. 13, on the other hand, allows a user to choose to execute any checklist stored in the system, or to mount an additional diskette containing sensitive checklists.

The left half of the window 140 is a scrollable list of all checklists (the page icon), and folders of checklists, on the console's disk. To choose a checklist, this list is scrolled up or down until the desired checklist is highlighted (BOMB THREAT). (Or, if the name is known, the user types the first few characters in the text keyboard.) Then he hits the "OK" key to run the checklist.

Figure 14:
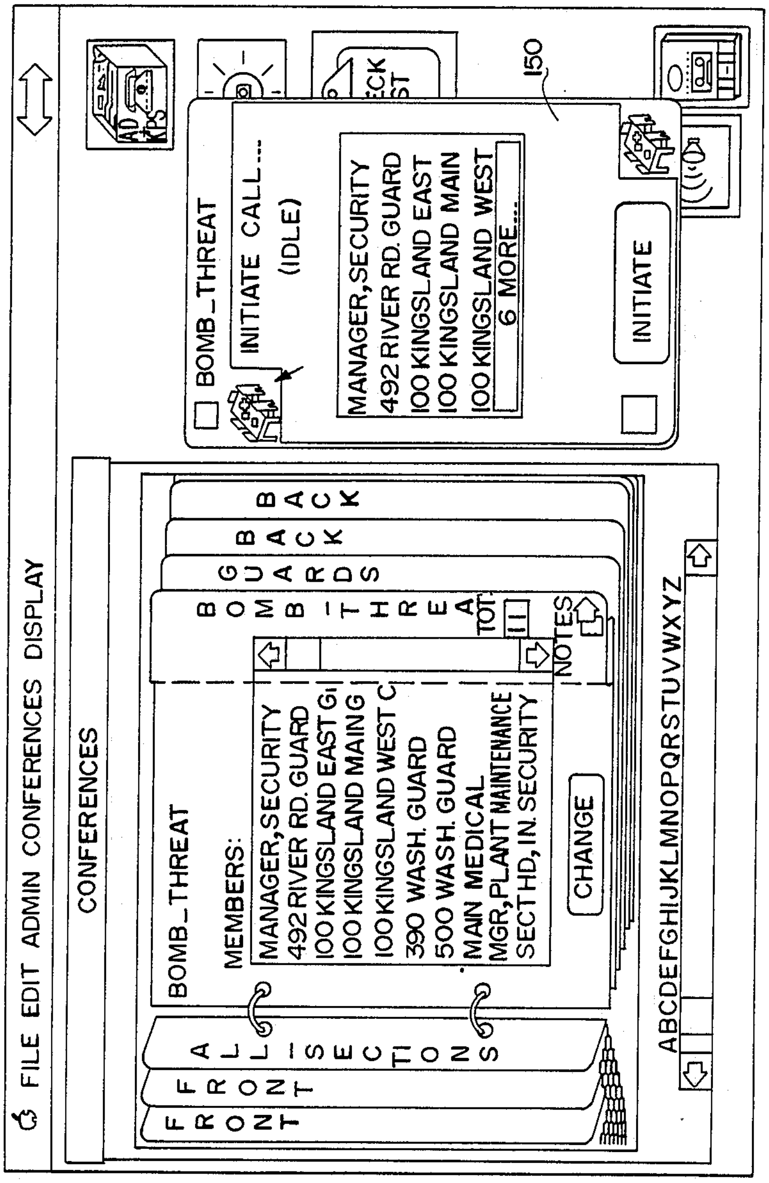
FIG. 14 is a diagram of still another display indicative of a conference mode provided by this system.

The windows for example of FIG. 14 allow access to a "notebook" of pre-defined conferences. The "notebook" has one conference per page and it is searched by either scrolling left/right, or typing the first few characters of the conference name. To see the rest of a list of conferees, the user scrolls up/down on a "page". The "notes" icon will fold the page out to show any special considerations or other notes on this conference. Hitting OK or RETURN will pull the conference card and put away the notebook.

The conference card 150 operates very similar to a subscriber card 96 of FIG. 7B: OK to initiate, Window Close to release, or click the conference table icon to return to the notebook, open to this conference.

Figure 15:
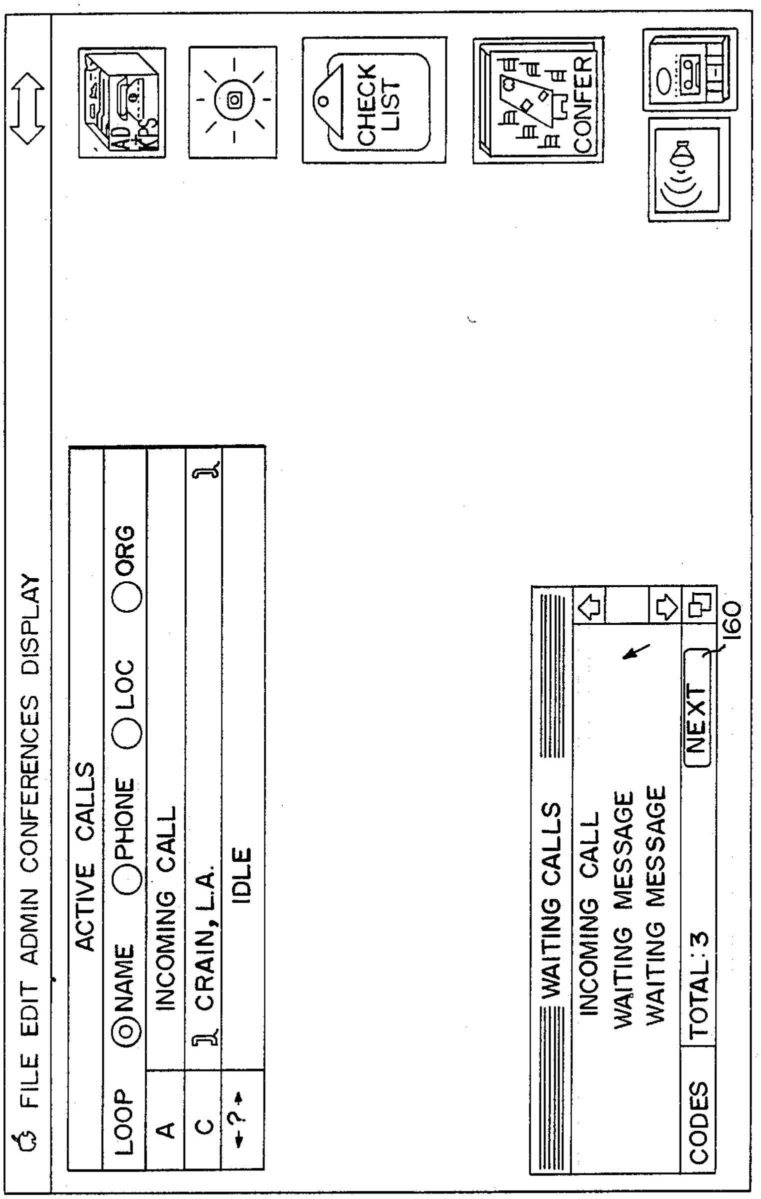
FIG. 15 is a diagram of a display indicative of a communications call provided by this system.

The WAITING CALLS window as shown in FIG. 15 appears automatically whenever a call is received at a console. Simultaneously, a "ringing" audible alert is generated. Calls are ordered by priority (if host switch provided this), then time of arrival. If the switch provides the originating phone number, the system will do a lookup in its "phone book", replacing "incoming call" with the actual originator if possible.

The "NEXT" button 160 on-screen (or OK button on the Window Control Pad) will connect to the top call. Alternatively, another call/message can be selected.

If the caller chooses to do so, rather than waiting for the console user to answer, he can leave a message, then hang up; two such callers have done so in the example of FIG. 15.

The ACTIVE CALLS is an info-only display, shown when multiple calls arein progress.

The system was designed as a generic system: to make it specific to a particular installation, the characteristics of that installation must be defined. This definition is done through a small number of databases. Most of these databases are simple formatted text files, which can be prepared and maintained on the processors; or, an organization's administrative data processing facilities (local or remote) can be used, and the databases downloaded into the system via its data communications functions.

The Sensor/Actuator Definition file (partially shown in FIG. 11) provides a detailed definition of all sensors and controls accessible to the system. In addition to specifying the description, type, connection point, normal state, and action to take if a sensor is triggered, this file specifies the sensor/actuator's display symbol and display location on the building map. This information is used in conjunction with the Floorplan file to display the alarm map.

A pivotal database in the Emergency Action Console is the Phonebook (displayed in FIG. 7A). In simple text form, this database contains the name, phone number, organization, and location of all individuals and organizations "known" to the console. This can be a very large file, several thousand entries or more.

For each of several critical individuals, the system maintains a "Key Personnel Status" file. The KPS file defines the individual's schedule, indicating alternate numbers where he/she can be reached. Often, this data will be prepared and maintained by the individual's secretary on the organization's administrative computer systems, and downloaded to the system periodically or when a change occurs.

The KPS mechanism also provides a convenient way of defining rotating duties. For instance, if a KPS file for a "pseudo-person" named DUTY-OFFICER contains the weekly schedule for this assignment, then checklists of CSAM buttons can simply "CALL DUTY-OFFICER". The system will automatically connect to the individual currently on duty.

A unique capability of the system is the "FACES" database. This group of files contains digital photographs of individuals, which can be used for verifying IDs of new or temporary staff members, and preparing photo badges. Because the photos are digital stored, they can also be electronically transmitted, as a mechanism for identifying incoming visitors, broadcasting "wanted" notices, etc. This is obviously a non-text database. Standard hardware/software allows the capture and digitization of video images; have an individual stand in front of a surveillance camera, and a digital "snapshot" is captured in seconds.

Checklists are also stored in the console computers, each as a separate file. The use and format of these files was shown previously.

The key administrative output of the system is the security event log. This file is generated by the environment and security processor 35 in both hardcopy 38 and on a dedicated floppy disk 37. It contains a sequential, time-stamped list of all sensor events, control actuations, and incoming/outgoing communications, and other "interesting" events that have occurred within the system. The floppy disk is periodically replaced; the old disk can then be analyzed off-line (locally, or physically/electronically transmitted to headquarters) to identify subtle problems such as an unexplained increase in false alarms.

If the Security Officer wants to review or modify any of the other databases, they can be printed, dumped on a removable disk, or uploaded to another computer system.

In addition, the sophisticated text processing, graphics, computation, database and terminal capabilities inherent in the user interface processor 66 can be used to provide the Security Officer with a state-of-the-art administrative workstation.

As indicated throughout the specification, the system, as shown in FIG. 1 and FIG. 2 and including the various displays depicted in the remaining Figures, is fabricated with commercially available components. It is an important aspect of the system to provide integrated operation to enable a single console, and therefore a single individual, to control and monitor the operation of an existing security and communications faculty. The object of the apparatus is to provide a system which will conveniently operate to monitor both an existing security or intrusion detection system and an existing communications facility. The aspect and operation of the system assumes the fact that both facilities will expand substantially in the future and hence the above-described system, in particular the layout of the system, anticipates for such expansion.

The environment and security processor 35, as indicated, is associated with the remote controllers to enable the processor to interface with sensors and actuating devices located in the installation or the facility. The environment and security processor 35 therefore operates to control the operation of the computers located at the console. Thus, as seen, at the console there is a user interface computer 66 and the position control computer 67. The computer 67 interfaces directly with the environment and security processor 35 and also interfaces with the user interface computer 66. In this manner the environment and security processor can establish communications with either of the computers.

In regard to the data bases which are utilized with this system and which for example are programmed to generate the various displays depicted, such data bases can be stored in the various computer memories as necessary. For example, the user interface computer 66 can contain certain of the data bases. The position control computer 67 can contain other of the data bases. It is also understood that the databases can be stored as shared between the memories of the computers or actually be stored in a computer or data network 52 which accesses directly to the command center console 14 of FIG. 1. The command center console communicates with the guard post console through the user interface computer 66 via the LAN network 20. In this manner huge amounts of directory storage can be accommodated by the system as necessary. Referring to FIG. 16, there is shown a block diagram of a remote controller as for example 31 and 32 of FIG. 2. As indicated, each remote controller is associated with a control computer 200. The control computer 200 interfaces by means of bidirectional buses 30 and 240 with the interface board 201.

As seen in FIG. 16, the interface board 201 has a terminal strip 202 for receiving the wired outputs of the manual patch/switch and display module 33 of FIG. 2. The terminal strip 202 has outputs which are directed to suitable interface modules 203. The interface module 203 include ordinary AC or DC amplifiers or reference level devices as comparators and essentially convert the output from terminal strip 202 into a suitable digital signal for the computer. Thus, the boards may typically contain level shifters and so on. There is an I/0 latch 205 which interfaces with all of the interface modules as 203. The purpose of the latch 205 is to store data from the interface boards and to direct the data to the control computer 200 when the control computer 200 requests/provides it. There is a card select module 206 which functions to select the particular interface board 201, 210 that control computer wishes to address.

As seen, the control computer consists of an input/output (I/0) buffer 226. The control computer contains a programmable read only memory (PROM) 225 and a RAM or random access memory 222. The control computer operates by means of the clock 221 which interfaces with the various computer modules through the address logic module 224 and via a central processing unit (CPU) 223. The output of the central processing unit 22 is directed to the environment and security processor as ESP 35 of FIG. 2. As indicated in FIG. 16, the interface board module 201 interfaces with the control computer 200 via the output buses 230 and 240.

Thus as indicated, the remote controller module as shown in FIG. 16 operates to interface with the various input/output devices to enable the remote controller to directly monitor and control clusters of sensors and actuators as for example wired into the manual patch and switch panel 33.

Figure 17:
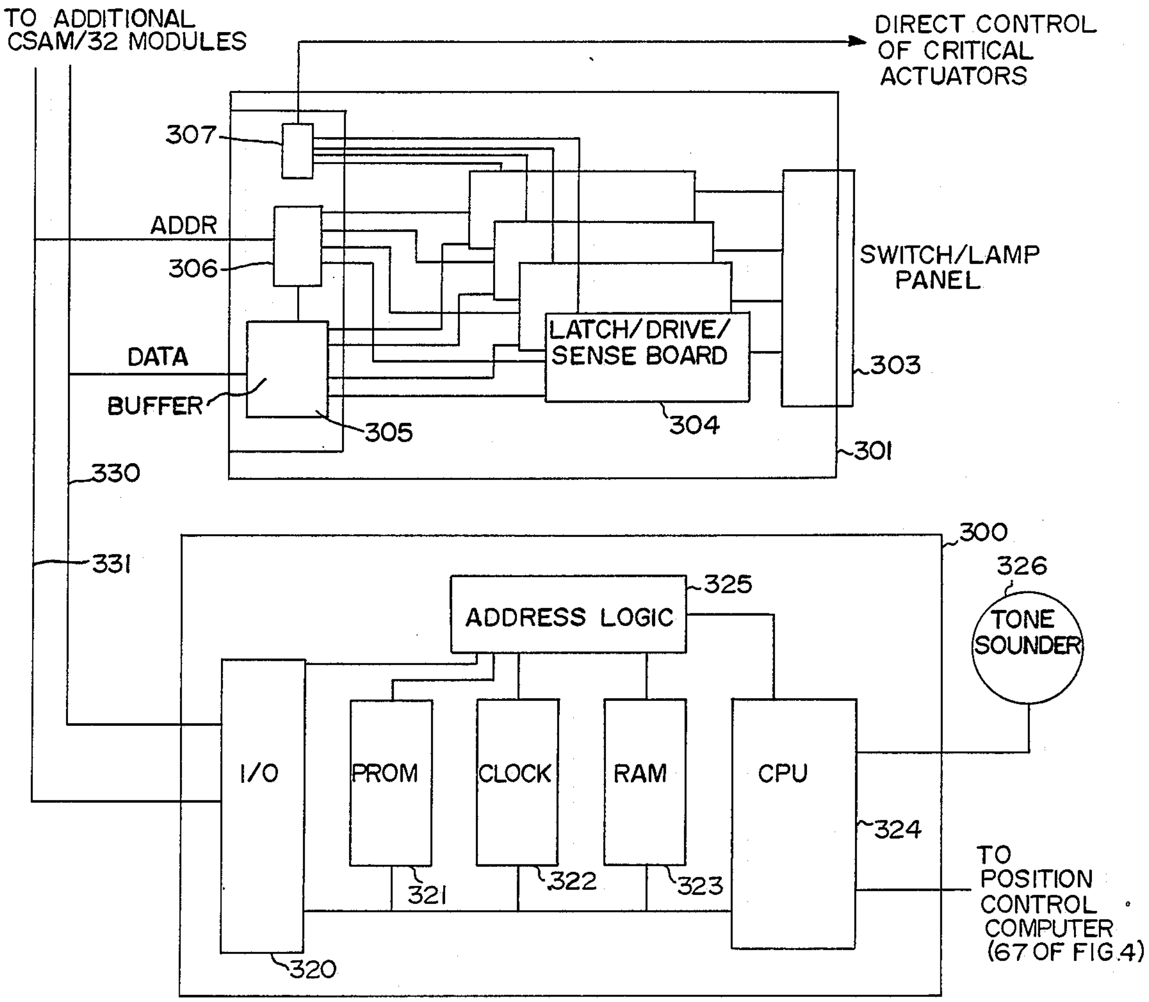
FIG. 17 is a block diagram of a Circuit Status and Access Module (CSAM) as used by the consoles of this system.

Referring to FIG. 17, there is shown a circuit status/access module or CSAM module as module 62 shown for example in FIG. 4. Each CSAM module as indicated is an intelligent control/display module which provides 32 user programmable function buttons. As seen in FIG. 17, the usable programmable function buttons are contained in the switch/lamp panel 303. The panel 303 interfaces with latch/drive/sense boards 304. The boards 304 may include amplifiers, level shifters, comparators and other devices to provide suitable output signals upon activation of the CSAM switches. These boards interface with a buffer 305 and address register 306. The address register allows the control computer 300 to select which of the switches or lamps are to be accessed. The illumination data for accessed lamps or status of switches is stored in the buffer 305 for input/output to the control computer 300.

The address module 306 as well as the buffer 305 interface with the control computer 300 via the buses 330 and 331. The control computer 300 is of similar format to the control computer 200 as shown in FIG. 16 and essentially contains an input/output (I/0) buffer 320, PROM 321, a clock generator 322, a random access memory (RAM) 323 and a central processing unit or CPU 324. All of the units are accessed by means of the address logic 325. The output of the CPU is directed to the position control computer 67 of FIG. 4.

As indicated in FIG. 17, there is one output directly to the position and control computer and a second output which drives a tone sounder. The first output interfaces with the position control computer as computer 67 of FIG. 4. The tone sounder 326 is used to inform the operator of various conditions or emergency conditions which may be associated with the CSAMs. As indicated, each CSAM module has 32 buttons associated therewith which are directed and located on the switch/lamp panel 303.

As further indicated, the console user has direct control of various external modules by means of a direct control interface 307 which connects via the latch/drive sense boards as 304 to a second contact on each switch of the switch/lamp panel 303. In this manner the operator can implement direct control of the external module(s) while bypassing the rest of the elements of the console as described above. As indicated briefly above, by employing the user interface computer, the user can program the console to treat a CSAM button as a command to place a call or conferences, run a crises response check list, operate remote actuators or invoke specialized customer program functions. The operation of the remote actuators is implemented through the remote controlers 30, 31, 32 as indicated above.

Each of the buttons associated with the CSAM module may include suitable indicators as for example a white lamp in the button plus a red, amber and green indicator light. These lights are illuminated by the position control computer via the control computer 300 to indicate the status of the circuit or function associated with the button and controlled thereby by means of the bidirectional buses 330 and 331.

As indicated above, the entire system with the exception of a few modules can be implemented by commercially available equipment including commercially available programs and hence the entire system is easy to implement and relatively economical in cost while providing for economical expansion capabilities. In order to further provide an indication of the same, a brief description of the various modules employed will be given.

The cabinet as for example shown in FIG. 1 which contains the command center console 14 is available from a company called Design West of Mission Viejo, California and designated as the SCC CoOnsole Cabinet. The cabinets for the guard post consoles as 10 and 11 are available from the same company and sold under the designation as POST-1 Console Cabinet. The cabinet for the ESP computer or processor 35 as shown in FIG. 1 is available from many suppliers as cabinet/desk type module. The local access network or LAN as 20 as shown in FIG. 2 is a typical fiber optics Apple talk network available from many sources as for example Dupont and other cmpanies as well.

The access/facility controller 30 is available from a company called Andover Controls as the Building/Access Controller, Part No. AC4+4. The control computers as shown in FIGS. 16 and 17 utilized to control the CSAM module as well as the remote controllers are single board control computers, Part No. BCC-52 available from Micromint Sales. The recorder shown in FIG. 4 as recorder 70 is available from Fordham Radio and designated as Tele-Recorder TR-460.

The dialer panel shown in FIG. 5B by reference numeral 90 is available from ITT DCD and entitled Function/Dialing Control Panel. The printer 38 as shown in FIGS. 1 and 2 is an Apple impact dot matrix printer as for example supplied by Apple Computer under the designation Imagewriter LQ.

Thus, as one can ascertain and as indicated above, the various components are available from different sources of supply as indicated in the specification and including the above-noted list. It should thus become apparent to those skilled in the art that the entire emergency action system defines a system which monitors and controls sensors and actuators which are associated with secured premise. In any event, the system utilizes the various computers to interface with the security and communication system and to provide integrated and responsive displays to enable the console operator to interface with each of the systems while further understanding the complete operation of each of the systems by means of the various menus and displays as provided by the system.

What is claimed:

1. An emergency action apparatus for use in an installation having a given floor plan format and maintained and operated by known, authorized personnel located on said installation, said installation requiring an intrusion detection system and a communications system, said emergency action apparatus providing an interface between said intrusion detection system and said communications system to enable a user to monitor said intrusion detection system and said communications system at a single location, comprising:

a console located at said location, said console including a position control computer in said console and having input means coupled to said communications system and operative to process data relating to said floor plan format of said installation, a first display located on said console and coupled to said position control computer to display processed data from said computer indicative of said floor plan format, a user interface computer located in said console and operative to process specialized databases containing information related to said personnel located in said installation to enable said user to determine the authorization of said personnel and including memory means having stored conference call data to enable said user to connect selected personnel together via said communications system to participate in a conference, a second display located on said console and coupled to said user interface computer to enable data as processed by said computer to be displayed, said user interface computer coupled to said position control computer to enable data to be transferred between said computers, means coupled to said memory means to enable said user to interface with said user interface computer via said second display wherein said user can set up conferences between personnel and display stored data regarding said personnel, an environment and security processor (ESP) located remote from said console and coupled to said intrusion detection system for processing data regarding said intrusion detection system and for storing data related to said floor-plan format and to provide and process data indicative of monitored detection system functions and having output lines coupled to said position control computer and said first display, a video matrix coupled to said processor and controlled thereby to provide video signals as provided by said intrusion detection system, a third display located on said console and coupled to said environment and security processor to display, said video signals as controlled by said environment and security processor.

2. The apparatus according to claim 1 further including at lease one controllable switch panel having a plurality of switches and including a dedicated control microprocessor coupled to said position control computer so that said position control computer can control said microprocessor, said controllable switch panel located on said console with at least one switch selected to be operated to control one of said monitored system functions according to a generated display from said position control computer.

3. The apparatus according to claim 2 wherein a given number of switches on said panel are directly connected to actuators located on said installation to enable said user to actuate said actuators from said console.

4. The apparatus according to claim 2 wherein at least one other of said plurality of switches is coupled directly to said intrusion detection system to control system operation directly from said console.

5. The apparatus according to claim 1 further including a data printer coupled to said environment and security processor for providing a hard copy data printout indicative of intrusion data processed by said processor.

6. The apparatus according to claim 1 further including:

a manual patch/switch and display panel coupled to said intrusion detection system for receiving sensor and actuator leads from said detection system at inputs of said panel and for directing said leads to outputs of said panel and means for coupling said outputs to said environment and security processor (ESP) whereby each sensor and actuator can be identified by said processor.

7. The apparatus according to claim 6 wherein said means for coupling includes a remote controller having inputs coupled to said panel and outputs coupled to said (ESP) processor.

8. The apparatus according to claim 7 wherein said (ESP) processor as coupled to said position control computer controls the display of said first and second displays to cause an alarm display to automatically appear when an intrusion is detected by said intrusion detection system.

9. The apparatus according to claim 1 wherein said environment and security processor is located at a secure location within said installation and remote from said console.

10. The apparatus according to claim 1 wherein said video matrix has inputs coupled to surveillance cameras located throughout said installation and outputs controlled by said environment and security processor to cause said third display to display video signals from any selected surveillance camera.

11. The apparatus according to claim 1 wherein said means coupled to said user interface computer includes a keyboard.

12. The apparatus according to claim 1 wherein said means coupled to said user interface computer includes a mouse.

13. The apparatus according to claim 1 wherein said memory means has stored therein a database containing a directory of personnel located in said location.

14. The apparatus according to claim 13 wherein said data base includes stored data indicative of key personnel.

15. The apparatus according to claim 1 further including a dialing means located on said console and coupled to said communications system to enable a user to access personnel via said communications system.

16. The apparatus according to claim 1 wherein said second display is a high resolution graphics display.

17. The apparatus according to claim 1 wherein said user interface computer further contains means for storing a database indicative of checklist procedures for informing said user of a procedure to be implemented as necessary to deal with a given intrusion as detected by said intrusion detection system.

18. The apparatus according to claim 1 further including a floppy disk means coupled to said environment and security processor to electronically store a log of events as processed by said processor.

19. The apparatus according to claim 1 wherein said communications system is a private automatic branch exchange (PABX).

20. The apparatus according to claim 1 wherein said user interface computer as coupled to said second display provides a display presentation based on stored data including symbols selectively accessed by said user via said display to enable said user to access other displays based on stored data in said user interface computer.

21. The apparatus according to claim 1 wherein said second display provides a two area display image as controlled by said user interface computer to display a first area indicative of main system data and a second area indicative of a menu bar to enable access to less frequently used data.

* * * * *